(12) United States Patent
Roth et al.

(10) Patent No.: US 8,171,001 B2
(45) Date of Patent: May 1, 2012

(54) USING A DATA MINING ALGORITHM TO GENERATE RULES USED TO VALIDATE A SELECTED REGION OF A PREDICTED COLUMN

(75) Inventors: Mary Ann Roth, San Jose, CA (US); Yannick Saillet, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 1130 days.

(21) Appl. No.: 11/769,634

(22) Filed: Jun. 27, 2007

(65) Prior Publication Data

US 2009/0006282 A1    Jan. 1, 2009

(51) Int. Cl.
*G06F 17/00* (2006.01)

(52) U.S. Cl. .................................... 707/694; 706/46

(58) Field of Classification Search .................. None
See application file for complete search history.

(56) References Cited

U.S. PATENT DOCUMENTS

| | | | |
|---|---|---|---|
| 5,594,900 | A | 1/1997 | Cohn et al. |
| 5,615,341 | A | 3/1997 | Agrawal et al. |
| 5,692,107 | A | 11/1997 | Simoudis et al. |
| 5,794,209 | A | 8/1998 | Agrawal et al. |
| 5,813,002 | A | 9/1998 | Agrawal et al. |
| 5,943,667 | A * | 8/1999 | Aggarwal et al. ............ 1/1 |
| 6,078,918 | A | 6/2000 | Allen et al. |
| 6,182,070 | B1 | 1/2001 | Megiddo et al. |
| 6,272,478 | B1 * | 8/2001 | Obata et al. ............ 706/12 |
| 6,278,997 | B1 | 8/2001 | Agrawal et al. |
| 6,311,173 | B1 * | 10/2001 | Levin et al. ............ 706/21 |
| 6,542,881 | B1 * | 4/2003 | Meidan et al. ............ 706/45 |
| 6,604,095 | B1 * | 8/2003 | Cesare et al. ............ 1/1 |
| 6,609,123 | B1 | 8/2003 | Cazemier et al. |
| 6,836,773 | B2 | 12/2004 | Tamayo et al. |

(Continued)

FOREIGN PATENT DOCUMENTS

CN    1435781 A    8/2003

(Continued)

OTHER PUBLICATIONS

Morgan, S.A. and T.G. Reish, "Implementation of Comprehensive Qualification and Validation of Entry Fields", Disclosure AT8940402, TDB, v38, n2, Feb. 1995, pp. 317-318.

(Continued)

*Primary Examiner* — Robert Timblin
*Assistant Examiner* — Richard Bowen
(74) *Attorney, Agent, or Firm* — David W. Victor; Konrad Raynes & Victor LLP

(57) ABSTRACT

Provided are an article of manufacture, system, and method for using a data mining algorithm to generate rules used to validate a selected region of a predicted column. A data set has a plurality of columns and records providing data for each of the columns. Selection is received of at least one predicted column for which rules are to be generated and at least one region of the selected at least one predicted column, wherein each region specifies data positions in the column. The data set is processed to determine association relationships among data in at least one predictor column and subsequences in the selected at least one region of the at least one predicted column. At least one rule is generated from the relationships specifying a condition involving at least one predictor column that predicts at least one value in the selected region of the at least one predicted column.

30 Claims, 13 Drawing Sheets

U.S. PATENT DOCUMENTS

| | | | |
|---|---|---|---|
| 6,850,947 B1 | 2/2005 | Chung et al. | |
| 6,877,012 B2 | 4/2005 | Ashida et al. | |
| 6,941,303 B2 | 9/2005 | Perrizo | |
| 6,954,756 B2 | 10/2005 | Arning et al. | |
| 6,965,888 B1 | 11/2005 | Cesare et al. | |
| 6,973,459 B1 | 12/2005 | Yarmus | |
| 7,028,288 B2* | 4/2006 | Wall et al. | 717/109 |
| 7,249,118 B2 | 7/2007 | Sandler et al. | |
| 7,266,537 B2 | 9/2007 | Jacobsen et al. | |
| 2002/0091707 A1 | 7/2002 | Keller | |
| 2003/0115280 A1* | 6/2003 | Quine et al. | 709/207 |
| 2003/0191667 A1 | 10/2003 | Fitzgerald et al. | |
| 2003/0212678 A1 | 11/2003 | Bloom et al. | |
| 2003/0217069 A1 | 11/2003 | Fagin et al. | |
| 2004/0093344 A1 | 5/2004 | Berger et al. | |
| 2004/0093559 A1 | 5/2004 | Amaru et al. | |
| 2004/0189708 A1 | 9/2004 | Larcheveque et al. | |
| 2004/0226002 A1 | 11/2004 | Larcheveque et al. | |
| 2005/0055369 A1 | 3/2005 | Gorelik et al. | |
| 2005/0060313 A1 | 3/2005 | Naimat et al. | |
| 2005/0066240 A1 | 3/2005 | Sykes et al. | |
| 2005/0066263 A1 | 3/2005 | Baugher | |
| 2005/0108631 A1 | 5/2005 | Amorin et al. | |
| 2005/0144552 A1 | 6/2005 | Kalthoff et al. | |
| 2005/0182739 A1 | 8/2005 | Dasu et al. | |
| 2005/0234688 A1 | 10/2005 | Pinto et al. | |
| 2005/0256892 A1 | 11/2005 | Harken | |
| 2006/0004740 A1* | 1/2006 | Dettinger et al. | 707/4 |
| 2006/0053382 A1* | 3/2006 | Gardner et al. | 715/764 |
| 2006/0136461 A1 | 6/2006 | Lee et al. | |
| 2006/0136462 A1 | 6/2006 | Campos et al. | |
| 2006/0167579 A1 | 7/2006 | Fujii et al. | |
| 2006/0253435 A1 | 11/2006 | Nishizawa et al. | |
| 2006/0274760 A1 | 12/2006 | Loher | |
| 2007/0073688 A1 | 3/2007 | Fry | |
| 2007/0106785 A1* | 5/2007 | Tandon | 709/224 |
| 2007/0179959 A1 | 8/2007 | Sharma et al. | |
| 2007/0239769 A1 | 10/2007 | Fazal et al. | |
| 2007/0294221 A1 | 12/2007 | Chen et al. | |
| 2008/0085742 A1* | 4/2008 | Karukka et al. | 455/569.1 |

FOREIGN PATENT DOCUMENTS

| | | |
|---|---|---|
| CN | 1145901 C | 4/2004 |

OTHER PUBLICATIONS

Seekamp, C. and K. Britton, "Dynamic Generation of Rules from Properties to Improve Rule Processing Performance", Disclosure RSW819990242, RD, n429, Article 134, Jan. 2000, pp. 172.

Shipway, R.E. and P.M. Tricker, "Data Validation and Correction by Context", Disclosure RO8700150, TDB, Sep. 1971, pp. 1132-1137.

US Patent Application filed on Jun. 27, 2007, entitled "Using a Data Mining Algorithm to Generate Format Rules Used to Validate Data Sets", invented by J.J. Labrie, D. Meeks, M.A. Roth, and Y. Saillet.

Wikipedia, "N-gram", [online], updated Apr. 10, 2007, [Retrieved on May 13, 2007], retrieved from the Internet at <URL: http://en.wikipedia.org/w/index.php?title=N-gram&printable=yes>.

Knobbe, A.J., "Multi-Relational Data Mining", Nov. 22, 2004, 130 pp.

Shekhar, S., B. Hamidzadeh, A. Kohli, & M. Coyle, "Learning Transformation Rules for Semantic Query Optimization: A Data-Driven Approach", IEEE Transactions on Knowledge and Data Engineering, vol. 5, Iss. 6, Dec. 1993, pp. 950-964.

U.S. Appl. No. 12/165,549, filed Jun. 30, 2008, entitled "Discovering Transformations Applied to a Source Table to Generate a Target Table", invented by T. Bittner, H. Kache, M.A. Roth, & Y. Saillet, 49 pp.

Wikipedia, "Apriori Algorithm", [online], Updated May 22, 2006, [retrieved on Jun. 20, 2008], retrieved from the Internet at <URL: http://en.wikipedia.org/w/index.php?title=apriori_algorithm&printable=yes>, 3 pp.

Williams, J., "Tools for Traveling Data", [online], Jun. 1997, [retrieved on Mar. 25, 2008], retrieved from the Internet at <URL: http://www.dbmsmag.com/9706d16.html>, 10 pp.

Data Mining Group, "Association Rules" [online], [Retrieved on Nov. 1, 2006]. Retrieved from the Internet at <URL: http://www.dmg.org/v3-1/AssociationRules.html>, 7 pp.

Data Mining Group, "Trees" [online], [Retrieved on Nov. 1, 2006]. Retrieved from the Internet at <URL: http://www.dmg.org/v3-1/TreeModel.html>, 18 pp.

Han, E.H., G. Karypis, and V. Kumar, "Scalable Parallel Data Mining for Association Rules", 1997 ACM, Proceedings of the 1997 ACM SIGMOD International Conference on Management of Data, pp. 277-288.

Hipp, J., U. Guntzer, & U. Grimmer, "Data Quality Mining- Making a Virtue of Necessity", Proceedings of the 6th ACM SIGMOD Workshop on Research Issues in Data Mining and Knowledge Discovery, 2001, pp. 52-57.

Janta-Polczynski, M. and E. Roventa, "Fuzzy Measures for Data Quality", 18th International Conference of the North American Fuzzy Information Processing Society, Jul. 1999, pp. 398-402.

Korn, F., A. Labrinidis, Y. Kotidis, & C. Faloutsos, "Quantifiable Data Mining Using Ratio Rules", The VLDB Journal, 2000, pp. 254-266.

Marchetti, C., M. Mecella, M. Scannapieco, and A. Virgillito, "Enabling Data Quality Notification in Cooperative Information Systems through a Web-Service Based Architecture", Proceedings of the Fourth International Conference on Web Information Systems Engineering, 2003, 4pp.

Marcus, A., J.I. Maletic, & K. Lin, "Ordinal Association Rules for Error Identification in Data Sets", Proceedings of the Tenth International Conference on Information and Knowledge Management, 2001, pp. 589-591.

Muller, H., U. Leser, & J. Freytag, "Mining for Patterns in Contradictory Data", Proceedings of the 2004 International Workshop on Information Quality in Information Systems, 2004, pp. 51-58.

Pudi, V., "Data Mining-Association Rules", [online], [retrieved on Nov. 1, 2006], retrieved from the Internet at <URL: http://www.iiitac.in/~vikram/mining.html>, 3 pp.

U.S. Appl. No. 11/609,307, filed Dec. 11, 2006, entitled "Using a Data Mining Algorithm to Discover Data Rules", invented by Roth, M.A., B.H. Chard, Y. Saillet, & H.C. Smith, 36 pp.

U.S. Appl. No. 11/779,251, filed Jul., 17, 2007, entitled "Managing Validation Models and Rules to Apply to Data Sets", invented by Labrie, J.J., G. Agrawal, M.A. Roth, & Y. Saillet, 34 pp.

Wang, R.Y., H.B. Kon, and S.E. Madnick, "Data Quality Requirements Analysis and Modeling", Proceedings of the Ninth International Conference on Data Engineering, 1999, pp. 670-677.

Wikipedia, "Decision Tree", [online], [retrieved on Nov. 1, 2006], retrieved from the Internet at <URL: http://en.wikipedia.org/w/index.php?title=Decision_tree&printable=yes>, 7 pp.

English Abstract for CN1435781A, published Aug. 13, 2003, 1 p.

English Abstract for CN1145901C, published Apr. 14, 2004, 1 p.

Nesvizhskii, A.I., F.F. Roos, J. Grossmann, M. Vogelzang, J.S. Eddes, W. Gruissem, S. Baginsky, and R. Aebersold, "Dynamic Spectrum Quality Assessment and Iterative Computational Analysis of Shotgun Proteomic Data", Molecular & Cellular Proteomics, vol. 5, © 2006, The American Society for Biochemistry and Molecular Biology, Inc., pp. 652-670.

Jingyi, D., "Survey of Association Rule Data Mining", © 1994-2009 China Academic Journal Electronic Publishing House, Total 2 pp [with English Abstract on p. 1].

Office Action 1, Apr. 14, 2011, for U.S. Appl. No. 11/769,639, Total 36 pp.

Amendment 1, Aug. 6, 2009, for U.S. Appl. No. 11/609,307, Total 16 pp.

Amendment 2, Mar. 10, 2010, for U.S. Appl. No. 11/609,307, Total 11 pp.

Final Office Action 1, Dec. 10, 2009, for U.S. Appl. No. 11/609,307, Total 10 pp.

Notice of Allowance 1, Apr. 19, 2010, for U.S. Appl. No. 11/609,307, Total 11 pp.

Notice of Allowance 2, Jun. 28, 2010, for U.S. Appl. No. 11/609,307, Total 9 pp.

Office Action 1, Mar. 30, 2011, for U.S. Appl. No. 12/165,549, Total 39 pp.

Office Action 1, Apr. 6, 2009, for U.S. Appl. No. 11/609,307, Total 26 pp.

Office Action 1, Apr. 5, 2010, for U.S. Appl. No. 11/779,251, Total 29 pp.

Final Office Action 1, Oct. 1, 2010, for U.S. Appl. No. 11/779,251, Total 23 pp.

Amendment 1, Jul. 6, 2010, for U.S. Appl. No. 11/779,251, Total 16 pp.

Amendment 2, Dec. 28, 2010, for U.S. Appl. No. 11/779,251, Total 18 pp.

Amendment 1, Jul. 14, 2011, for U.S. Appl. No. 11/769,639, filed Jun. 27, 2007, by J.J. Labrie et al., Total 16 pp.

Amendment 1, Jun. 30, 2011, for U.S. Appl. No. 12/165,549, filed Jun. 30, 2008, by T. Bittner et al., Total 19 pp.

Final Office Action 1, Sep. 22, 2011, for U.S. Appl. No. 12/165,549, filed Jun. 30, 2008, by T. Bittner et al., Total 31 pp.

Notice of Allowance 1, Aug. 29, 2011, for U.S. Appl. No. 11/779,251, filed Jul. 17, 2007, by J.J. Labrie et al., Total 18 pp.

Notice of Allowance, Sep. 22, 2011, for U.S. Appl. No. 11/769,639, filed Jun. 27, 2007, by J.J. Labrie et al., Total 19 pp.

Peim, M., E. Franconi, and N. W. Paton, "Estimating the Quality of Answers when Querying over Description Logic Ontologies", Data & Knowledge Engineering, © 2003, Total 25 pp.

Notice of Allowance 2, Dec. 14, 2011, for U.S. Appl. No. 11/769,639, filed on Jun. 27, 2007 by J.J. Labrie et al., Total 15 pp. [57.142 (NOA2)].

* cited by examiner

Pivoted Data Set

FIG. 7

| ORDER_ | SITE_ID | CITY | STATE | ZIPCODE | REF | STATUS |
|---|---|---|---|---|---|---|
| CL2684435464 | 00047 | GRAND RAPIDS | MI | 49504 | 151932985 | 0 |
| CL2684435465 | 00048 | FLINT | MI | 48503 | 017031329 | 0 |
| CL2684435466 | 00049 | CADILLAC | MI | 49601 | 084674480 | 0 |
| CL2684435467 | 00052 | ASHLAND | KY | 41101 | 008856304 | 0 |
| CL2684435470 | 00055 | FAIRHAVEN | MA | 02719 | 001766500 | 1 |
| CL2684435471 | 00056 | WORCESTER | MA | 01613 | | 0 |
| CL2684435472 | 00057 | Jacksonville | FL | 32216 | 004078192 | 0 |
| CL2684435473 | 00058 | GAINESVILLE | FL | 32609 | 009827619 | 0 |
| CL2684435474 | 00060 | SYRACUSE | NY | 13221 | 121331342 | 0 |
| CL2684435475 | 00062 | SAINT MARYS | PA | 15857 | 003899630 | 0 |
| CL2684435476 | 00064 | SANDUSKY | OH | 44870 | 018298836 | 0 |
| CL2684435477 | 00065 | SAN JOSE | CA | 95126 | 029279213 | 0 |
| CL2684435478 | 00067 | ELMIRA | NY | 14901 | 002467496 | 0 |
| CL2684435479 | 00072 | ORLANDO | FL | 32811 | 058251133 | 0 |
| CL2684435480 | 00073 | GREENVILLE | SC | 29601 | 036158095 | 0 |
| CL2684435481 | 00074 | PHOENIX | AZ | 85034 | 035891977 | 0 |
| CL2684435482 | 00075 | SAVANNAH | GA | 31405 | 082822347 | 0 |
| CL2684435483 | 00076 | OAK PARK | MI | 48237 | 017358185 | 0 |
| CL2684435484 | 00077 | CITRUS HEIGHTS | CA | 95621 | 039366091 | 0 |
| CL2684435485 | 00078 | CHARLOTTE | NC | 28217 | 108701269 | 0 |
| CL2684435486 | 00079 | FARGO | ND | 58102 | 047255799 | 0 |
| CL2684435487 | 00080 | FORT WORTH | TX | 76107 | | 0 |
| CL2684435488 | 00081 | CHARLESTON | WV | 25311 | 007944580 | 0 |
| CL2684435489 | 00082 | BROOKLYN | NY | 11232 | 153999289 | 0 |
| CL2684435490 | 00083 | SPOKANE | WA | 99207 | 027522515 | 0 |
| CL2684435491 | 00084 | ARLINGTON | TX | 76015 | 039599147 | 0 |
| CL2684435492 | 00086 | CHERRY HILL | NJ | 08002 | 058992330 | 0 |
| CL2684435493 | 00087 | MASON CITY | IA | 50401 | 022244495 | 0 |
| CL2684435494 | 00089 | SPENCER | IA | 51301 | 022335947 | 0 |
| CL2684435495 | 00090 | MADISON | WI | 53704 | 023316409 | 0 |
| CL2684435496 | 00091 | LOS ANGELES | CA | 90051 | 157067232 | 0 |

| TRANSID | ITEM |
|---|---|
| 1 | ORDER_ID=CL268435464 |
| 1 | SITE_ID=00047 |
| 1 | CITY=GRAND RAPIDS |
| 1 | STATE=MI |
| 1 | ZIPCODE=49504 |
| 1 | SUBSTR_0_0_ZIPCODE=4 |
| 1 | SUBSTR_1_1_ZIPCODE=9 |
| 1 | SUBSTR_2_2_ZIPCODE=5 |
| 1 | SUBSTR_0_1_ZIPCODE=49 |
| 1 | SUBSTR_1_2_ZIPCODE=95 |
| 1 | SUBSTR_0_2_ZIPCODE=495 |
| 1 | REF=151932985 |
| 1 | STATUS=0 |
| 2 | ORDER_ID=CL268435465 |
| 2 | SITE_ID=00048 |
| 2 | CITY=FLINT |
| 2 | STATE=MI |
| 2 | ZIPCODE=48503 |
| 2 | SUBSTR_0_0_ZIPCODE=4 |
| 2 | SUBSTR_1_1_ZIPCODE=8 |
| 2 | SUBSTR_2_2_ZIPCODE=5 |
| 2 | SUBSTR_0_1_ZIPCODE=48 |
| 2 | SUBSTR_1_2_ZIPCODE=85 |
| 2 | SUBSTR_0_2_ZIPCODE=485 |
| 2 | REF=017031329 |
| 2 | STATUS=0 |
| 3 | ORDER_ID=CL268435466 |
| 3 | SITE_ID=00049 |
| 3 | CITY=CADILLAC |
| 3 | STATE=MI |
| 3 | ZIPCODE=49601 |
| 3 | SUBSTR_0_0_ZIPCODE=4 |
| 3 | SUBSTR_1_1_ZIPCODE=9 |
| 3 | SUBSTR_2_2_ZIPCODE=6 |
| 3 | SUBSTR_0_1_ZIPCODE=49 |
| 3 | SUBSTR_1_2_ZIPCODE=96 |
| 3 | SUBSTR_0_2_ZIPCODE=496 |
| 3 | REF=084674480 |
| 3 | STATUS=0 |
| 4 | ORDER_ID=CL268435467 |
| 4 | SITE_ID=00052 |
| 4 | CITY=ASHLAND |
| 4 | STATE=KY |
| 4 | ZIPCODE=41101-7828 |
| 4 | SUBSTR_0_0_ZIPCODE=4 |
| 4 | SUBSTR_1_1_ZIPCODE=1 |
| 4 | SUBSTR_2_2_ZIPCODE=1 |
| 4 | SUBSTR_0_1_ZIPCODE=41 |
| 4 | SUBSTR_1_2_ZIPCODE=11 |
| 4 | SUBSTR_0_2_ZIPCODE=411 |
| 4 | REF=008856304 |
| 4 | STATUS=0 |
| 5 | ORDER_ID=CL268435470 |
| 5 | SITE_ID=00055 |
| 5 | CITY=FAIRHAVEN |
| 5 | STATE=MA |
| 5 | ZIPCODE=02719 |
| 5 | SUBSTR_0_0_ZIPCODE=0 |
| 5 | SUBSTR_1_1_ZIPCODE=2 |
| 5 | SUBSTR_2_2_ZIPCODE=7 |
| 5 | SUBSTR_0_1_ZIPCODE=02 |
| 5 | SUBSTR_1_2_ZIPCODE=27 |
| 5 | SUBSTR_0_2_ZIPCODE=027 |
| 5 | REF=001766500 |
| 5 | STATUS=1 |
| ... | |

| RULE | | SUPPORT | CONFIDENCE | LIFT ← 304 |
|---|---|---|---|---|
| 1 | [STATE=MI] ==> [SUBSTR_0_0_ZIPCODE=4] | 8.5934% | 100.0000% | 4.7072 |
| | [SUBSTR_0_0_ZIPCODE=4] ==> [STATE=MI] | 8.5934% | 40.4505% | 4.7072 |
| | [STATUS=0]+[SUBSTR_0_0_ZIPCODE=4] ==> [STATE=MI] | 8.4937% | 40.3409% | 4.6944 |
| | [STATUS=0]+[STATE=MI] ==> [SUBSTR_0_0_ZIPCODE=4] | 8.4937% | 100.0000% | 4.7072 |
| 5 | [SUBSTR_0_0_ZIPCODE=9] ==> [STATE=CA] | 8.1647% | 78.2983% | 9.5899 |
| | [STATE=CA] ==> [SUBSTR_0_0_ZIPCODE=9] | 8.1647% | 100.0000% | 9.5899 |
| | [STATUS=0]+[SUBSTR_0_0_ZIPCODE=9] ==> [STATE=CA] | 8.1348% | 78.2359% | 9.5822 |
| | [STATUS=0]+[STATE=CA] ==> [SUBSTR_0_0_ZIPCODE=9] | 8.1348% | 100.0000% | 9.5899 |
| | [STATE=IL] ==> [SUBSTR_0_0_ZIPCODE=6] | 8.1148% | 99.5110% | 8.7947 |
| 10 | [SUBSTR_0_0_ZIPCODE=6] ==> [STATE=IL] | 8.1148% | 71.7181% | 8.7947 |
| | [STATUS=0]+[STATE=IL] ==> [SUBSTR_0_0_ZIPCODE=6] | 8.1049% | 99.6324% | 8.8054 |
| | [STATUS=0]+[SUBSTR_0_0_ZIPCODE=6] ==> [STATE=IL] | 8.1049% | 71.7564% | 8.7994 |
| | [STATE=OH] ==> [SUBSTR_0_0_ZIPCODE=4] | 7.6563% | 99.8700% | 4.7011 |
| | [SUBSTR_0_0_ZIPCODE=4] ==> [STATE=OH] | 7.6563% | 36.0394% | 4.7011 |
| 15 | [STATUS=0]+[SUBSTR_0_0_ZIPCODE=4] ==> [STATE=OH] | 7.6064% | 36.1269% | 4.7125 |
| | [STATUS=0]+[STATE=OH] ==> [SUBSTR_0_0_ZIPCODE=4] | 7.6064% | 99.8691% | 4.7010 |
| | [SUBSTR_1_1_ZIPCODE=8] ==> [SUBSTR_0_0_ZIPCODE=4] | 6.0014% | 45.7795% | 2.1549 |
| | [SUBSTR_0_0_ZIPCODE=4]+[SUBSTR_1_1_ZIPCODE=8] ==> [STATE=MI] | 6.0014% | 28.2496% | 4.7072 |
| | [SUBSTR_0_1_ZIPCODE=48] ==> [SUBSTR_1_1_ZIPCODE=8] | 6.0014% | 100.0000% | 7.6281 |
| 20 | [SUBSTR_1_1_ZIPCODE=8]+[STATE=MI] ==> [SUBSTR_0_1_ZIPCODE=48] | 6.0014% | 100.0000% | 16.6628 |
| | [SUBSTR_1_1_ZIPCODE=8] ==> [SUBSTR_0_1_ZIPCODE=48] | 6.0014% | 100.0000% | 4.7072 |
| | [SUBSTR_0_1_ZIPCODE=48]+[STATE=MI] ==> [SUBSTR_0_0_ZIPCODE=4] | 6.0014% | 100.0000% | 5.3273 |
| | [SUBSTR_0_1_ZIPCODE=48] ==> [STATE=MI] | 6.0014% | 69.8376% | 7.6281 |
| | [SUBSTR_0_1_ZIPCODE=48] ==> [SUBSTR_0_0_ZIPCODE=4] | 6.0014% | 100.0000% | 11.6369 |
| 25 | [SUBSTR_0_1_ZIPCODE=48] ==> [SUBSTR_1_1_ZIPCODE=8] | 6.0014% | 45.7795% | 7.6281 |
| | [SUBSTR_0_1_ZIPCODE=48] ==> [STATE=MI] | 6.0014% | 100.0000% | 11.6369 |
| | [SUBSTR_1_1_ZIPCODE=8]+[SUBSTR_0_0_ZIPCODE=4] ==> [SUBSTR_0_1_ZIPCODE=48] | 6.0014% | 100.0000% | 11.6369 |
| | [SUBSTR_1_1_ZIPCODE=8]+[STATE=MI] ==> [SUBSTR_0_0_ZIPCODE=4] | 6.0014% | 100.0000% | 4.7072 |
| | [SUBSTR_0_0_ZIPCODE=4]+[SUBSTR_1_1_ZIPCODE=8] ==> [SUBSTR_0_1_ZIPCODE=48] | 6.0014% | 69.8376% | 4.7072 |
| 30 | [SUBSTR_0_0_ZIPCODE=4]+[SUBSTR_0_1_ZIPCODE=48] ==> [STATE=MI] | 6.0014% | 100.0000% | 4.7072 |
| | [SUBSTR_0_0_ZIPCODE=4] ==> [SUBSTR_1_1_ZIPCODE=8] | 6.0014% | 28.2496% | 2.1549 |
| | [SUBSTR_1_1_ZIPCODE=8]+[SUBSTR_0_0_ZIPCODE=4] ==> [STATE=MI] | 6.0014% | 100.0000% | 16.6628 |
| | [SUBSTR_1_1_ZIPCODE=8] ==> [STATE=MI] | 6.0014% | 69.8376% | 5.3273 |
| | [SUBSTR_1_1_ZIPCODE=8] ==> [SUBSTR_0_1_ZIPCODE=48] | 6.0014% | 100.0000% | 7.6281 |
| 35 | [STATE=MI] ==> [SUBSTR_0_1_ZIPCODE=48] | 6.0014% | 69.8376% | 11.6369 |
| | [SUBSTR_1_1_ZIPCODE=8] ==> [STATE=MI] | 6.0014% | 100.0000% | 11.6369 |
| | [SUBSTR_0_0_ZIPCODE=4] ==> [STATE=MI] | 6.0014% | 100.0000% | 4.7072 |
| | [SUBSTR_1_1_ZIPCODE=8] ==> [STATE=MI] | 6.0014% | 45.7795% | 5.3273 |
| | [SUBSTR_0_0_ZIPCODE=7] ==> [STATE=TX] | 5.9216% | 65.4185% | 11.0474 |

FIG. 9

| RULE | | SUPPORT | CONFIDENCE | LIFT |
|---|---|---|---|---|
| 1 | [STATE=MI] ===> [SUBSTR_0_0_ZIPCODE=4] | 8.5934% | 100.0000% | 4.7072 |
| 2 | [SUBSTR_0_0_ZIPCODE=4] ===> [STATE=MI] | 8.5934% | 40.4505% | 4.7072 |
| 3 | [STATUS=0]+[SUBSTR_0_0_ZIPCODE=4] ===> [STATE=MI] | 8.4937% | 40.3409% | 4.6944 |
| 4 | [STATUS=0]+[STATE=MI] ===> [SUBSTR_0_0_ZIPCODE=4] | 8.4937% | 100.0000% | 4.7072 |
| 5 | [SUBSTR_0_0_ZIPCODE=9] ===> [STATE=CA] | 8.1647% | 78.2983% | 9.5899 |
| 6 | [STATE=CA] ===> [SUBSTR_0_0_ZIPCODE=9] | 8.1647% | 100.0000% | 9.5899 |
| 7 | [STATUS=0]+[SUBSTR_0_0_ZIPCODE=9] ===> [STATE=CA] | 8.1348% | 78.2359% | 9.5822 |
| 8 | [STATUS=0]+[STATE=CA] ===> [SUBSTR_0_0_ZIPCODE=9] | 8.1348% | 100.0000% | 9.5899 |
| 9 | [STATE=IL] ===> [SUBSTR_0_0_ZIPCODE=6] | 8.1148% | 99.5110% | 8.7947 |
| 10 | [SUBSTR_0_0_ZIPCODE=6] ===> [STATE=IL] | 8.1148% | 71.7181% | 8.7947 |
| 11 | [STATUS=0]+[STATE=IL] ===> [SUBSTR_0_0_ZIPCODE=6] | 8.1049% | 99.5324% | 8.8054 |
| 12 | [STATUS=0]+[SUBSTR_0_0_ZIPCODE=6] ===> [STATE=IL] | 8.1049% | 71.7564% | 8.7994 |
| 13 | [STATE=OH] ===> [SUBSTR_0_0_ZIPCODE=4] | 7.6563% | 99.8700% | 4.7011 |
| 14 | [SUBSTR_0_0_ZIPCODE=4] ===> [STATE=OH] | 7.6563% | 36.0394% | 4.7011 |
| 15 | [STATUS=0]+[SUBSTR_0_0_ZIPCODE=4] ===> [STATE=OH] | 7.6064% | 36.1269% | 4.7125 |
| 16 | [STATUS=0]+[STATE=OH] ===> [SUBSTR_0_0_ZIPCODE=4] | 7.6064% | 99.8691% | 4.7010 |
| 17 | [SUBSTR_1_1_ZIPCODE=8] ===> [SUBSTR_0_0_ZIPCODE=4] | 6.0014% | 45.7795% | 2.1549 |
| 18 | [SUBSTR_0_0_ZIPCODE=4] ===> [SUBSTR_0_1_ZIPCODE=48] | 6.0014% | 28.2496% | 4.7072 |
| 19 | [SUBSTR_0_1_ZIPCODE=48] ===> [SUBSTR_1_1_ZIPCODE=8] | 6.0014% | 100.0000% | 7.6281 |
| 20 | [SUBSTR_1_1_ZIPCODE=8]+[STATE=MI] ===> [SUBSTR_0_1_ZIPCODE=8] | 6.0014% | 100.0000% | 16.6628 |
| 21 | [SUBSTR_0_1_ZIPCODE=48]+[SUBSTR_0_0_ZIPCODE=4] ===> [STATE=MI] | 6.0014% | 69.8376% | 4.7072 |
| 22 | [SUBSTR_0_1_ZIPCODE=48]+[SUBSTR_0_0_ZIPCODE=4] ===> [SUBSTR_0_0_ZIPCODE=4] | 6.0014% | 100.0000% | 5.3273 |
| 23 | [SUBSTR_0_1_ZIPCODE=48]+[STATE=MI] ===> [SUBSTR_1_1_ZIPCODE=8] | 6.0014% | 100.0000% | 7.6281 |
| 24 | [SUBSTR_1_1_ZIPCODE=8] ===> [SUBSTR_0_1_ZIPCODE=48] | 6.0014% | 100.0000% | 11.6369 |
| 25 | [SUBSTR_0_1_ZIPCODE=48] ===> [STATE=MI] | 6.0014% | 45.7795% | 7.6281 |
| 26 | [SUBSTR_0_1_ZIPCODE=48]+[SUBSTR_1_1_ZIPCODE=8] ===> [SUBSTR_0_1_ZIPCODE=48] | 6.0014% | 100.0000% | 11.6369 |
| 27 | [SUBSTR_0_1_ZIPCODE=48] ===> [STATE=MI] | 6.0014% | 100.0000% | 11.6369 |
| 28 | [SUBSTR_0_1_ZIPCODE=4]+[STATE=MI] ===> [SUBSTR_0_1_ZIPCODE=48] | 6.0014% | 100.0000% | 11.6369 |
| 29 | [SUBSTR_0_1_ZIPCODE=48]+[SUBSTR_1_1_ZIPCODE=8] ===> [STATE=MI] | 6.0014% | 69.8376% | 4.7072 |
| 30 | [SUBSTR_0_1_ZIPCODE=48] ===> [SUBSTR_0_0_ZIPCODE=4] | 6.0014% | 100.0000% | 4.7072 |
| 31 | [SUBSTR_0_0_ZIPCODE=4] ===> [SUBSTR_1_1_ZIPCODE=8] | 6.0014% | 28.2496% | 2.1549 |
| 32 | [STATE=MI] ===> [SUBSTR_0_1_ZIPCODE=48] | 6.0014% | 100.0000% | 16.6628 |
| 33 | [SUBSTR_1_1_ZIPCODE=8]+[STATE=MI] ===> [SUBSTR_0_0_ZIPCODE=4] | 6.0014% | 100.0000% | 5.3273 |
| 34 | [SUBSTR_1_1_ZIPCODE=8]+[SUBSTR_0_0_ZIPCODE=4] ===> [STATE=MI] | 6.0014% | 69.8376% | 7.6281 |
| 35 | [SUBSTR_1_1_ZIPCODE=8]+[SUBSTR_0_0_ZIPCODE=4] ===> [SUBSTR_0_1_ZIPCODE=48] | 6.0014% | 100.0000% | 11.6369 |
| 36 | [SUBSTR_0_0_ZIPCODE=4]+[STATE=MI] ===> [SUBSTR_0_0_ZIPCODE=4] | 6.0014% | 100.0000% | 4.7072 |
| 37 | [SUBSTR_0_0_ZIPCODE=8] ===> [STATE=MI] | 6.0014% | 45.7795% | 5.3273 |
| 38 | [SUBSTR_0_0_ZIPCODE=7] ===> [STATE=TX] | 5.9216% | 65.4185% | 11.0474 |

FIG. 10

| RULE | | SUPPORT | CONFIDENCE | LIFT |
|---|---|---|---|---|
| 1 | [CITY=CHICAGO] ===> [SUBSTR_0_0_ZIPCODE=6] | 1.5452% | 100.0000% | 8.8379 |
| | [CITY=CHICAGO] ===> [SUBSTR_0_1_ZIPCODE=60] | 1.5452% | 100.0000% | 17.0886 |
| | [CITY=CHICAGO] ===> [SUBSTR_0_2_ZIPCODE=606] | 1.5352% | 99.3548% | 61.9024 |
| | [CITY=CHICAGO] ===> [SUBSTR_1_1_ZIPCODE=0] | 1.5452% | 100.0000% | 7.0541 |
| 5 | [CITY=CHICAGO] ===> [SUBSTR_1_2_ZIPCODE=06] | 1.5352% | 99.3548% | 42.4097 |
| | [CITY=CHICAGO] ===> [SUBSTR_2_2_ZIPCODE=6] | 1.5352% | 99.3548% | 10.7280 |
| | [CITY=CHICAGO]+[STATE=IL] ===> [SUBSTR_0_0_ZIPCODE=6] | 1.5452% | 100.0000% | 8.8379 |
| | [CITY=CHICAGO]+[STATE=IL] ===> [SUBSTR_0_1_ZIPCODE=60] | 1.5452% | 100.0000% | 17.0886 |
| | [CITY=CHICAGO]+[STATE=IL] ===> [SUBSTR_0_2_ZIPCODE=606] | 1.5352% | 99.3548% | 61.9024 |
| 10 | [CITY=CHICAGO]+[STATE=IL] ===> [SUBSTR_1_1_ZIPCODE=0] | 1.5452% | 100.0000% | 7.0541 |
| | [CITY=CHICAGO]+[STATE=IL] ===> [SUBSTR_1_2_ZIPCODE=06] | 1.5352% | 99.3548% | 42.4097 |
| | [CITY=CHICAGO]+[STATE=IL] ===> [SUBSTR_2_2_ZIPCODE=6] | 1.5352% | 99.3548% | 10.7280 |
| | [STATE=CA] ===> [SUBSTR_0_0_ZIPCODE=9] | 8.1647% | 100.0000% | 9.5899 |
| | [STATE=CA] ===> [SUBSTR_0_1_ZIPCODE=90] | 2.0736% | 25.3968% | 12.2479 |
| 15 | [STATE=CA] ===> [SUBSTR_0_1_ZIPCODE=94] | 1.7147% | 21.0012% | 12.2479 |
| | [STATE=CA] ===> [SUBSTR_0_2_ZIPCODE=90 OR 94] | 3.7883% | 46.3980% | 12.2479 |
| | [STATE=CA] ===> [SUBSTR_1_1_ZIPCODE=0] | 2.0736% | 25.3968% | 1.7915 |
| | [STATE=CA] ===> [SUBSTR_1_1_ZIPCODE=4] | 1.7147% | 21.0012% | 1.9065 |
| | [STATE=CA] ===> [SUBSTR_2_2_ZIPCODE=0 OR 4] | 3.7883% | 46.3980% | 1.8418 |
| 20 | [STATE=CT] ===> [SUBSTR_0_0_ZIPCODE=0] | 1.9639% | 99.4949% | 10.0507 |
| | [STATE=CT] ===> [SUBSTR_0_1_ZIPCODE=06] | 1.9639% | 99.4949% | 50.6616 |
| | [STATE=CT] ===> [SUBSTR_1_1_ZIPCODE=6] | 1.9639% | 99.4949% | 13.1493 |
| | [STATE=FL] ===> [SUBSTR_0_0_ZIPCODE=3] | 2.6617% | 99.6269% | 11.5533 |
| | [STATE=GA] ===> [SUBSTR_0_0_ZIPCODE=3] | 2.4624% | 100.0000% | 11.5965 |
| 25 | [STATE=GA] ===> [SUBSTR_0_1_ZIPCODE=30] | 1.8044% | 73.2794% | 40.6113 |
| | [STATE=GA] ===> [SUBSTR_1_1_ZIPCODE=0] | 1.8044% | 73.2794% | 5.1692 |
| | [STATE=IL] ===> [SUBSTR_0_0_ZIPCODE=6] | 8.1148% | 99.5110% | 8.7947 |
| | [STATE=IL] ===> [SUBSTR_0_1_ZIPCODE=60] | 5.8519% | 71.7604% | 12.2628 |
| | [STATE=IL] ===> [SUBSTR_0_1_ZIPCODE=61] | 1.6549% | 20.2934% | 12.2628 |
| 30 | [STATE=IL] ===> [SUBSTR_0_2_ZIPCODE=60 OR 61] | 7.5068% | 92.0538% | 12.2628 |
| | [STATE=IL] ===> [SUBSTR_0_2_ZIPCODE=606] | 1.6050% | 19.6822% | 12.2628 |
| | [STATE=IL] ===> [SUBSTR_1_1_ZIPCODE=0] | 5.8519% | 71.7604% | 5.0621 |
| | [STATE=IL] ===> [SUBSTR_1_1_ZIPCODE=1] | 1.6549% | 20.2934% | 2.3291 |
| | [STATE=IL] ===> [SUBSTR_1_2_ZIPCODE=0 OR 1] | 7.5068% | 92.0538% | 4.0217 |
| 35 | [STATE=IL] ===> [SUBSTR_1_2_ZIPCODE=06] | 1.6050% | 19.6822% | 8.4013 |
| | [STATE=IL] ===> [SUBSTR_2_2_ZIPCODE=1] | 2.0337% | 24.9389% | 1.6711 |
| | [STATE=IL] ===> [SUBSTR_2_2_ZIPCODE=6] | 1.7845% | 21.8826% | 2.3628 |
| | [STATE=IL] ===> [SUBSTR_2_2_ZIPCODE=1 OR 6] | 3.8182% | 46.8215% | 1.9360 |
| | [STATE=IN] ===> [SUBSTR_0_0_ZIPCODE=4] | 3.6686% | 99.4595% | 4.6817 |
| | ... | | | |

FIG. 11

| RULE | | SUPPORT | CONFIDENCE | LIFT |
|---|---|---|---|---|
| 1 | [CITY=CHICAGO] ===> [SUBSTR_0_0_ZIPCODE=6] | 1.5452% | 100.0000% | 8.8379 |
|  | [CITY=CHICAGO] ===> [SUBSTR_0_1_ZIPCODE=60] | 1.5452% | 100.0000% | 17.0886 |
|  | [CITY=CHICAGO] ===> [SUBSTR_0_2_ZIPCODE=606] | 1.5335% | 99.3548% | 61.9024 |
|  | [CITY=CHICAGO] ===> [SUBSTR_1_1_ZIPCODE=0] | 1.5452% | 100.0000% | 7.0541 |
| 5 | [CITY=CHICAGO] ===> [SUBSTR_1_2_ZIPCODE=06] | 1.5335% | 99.3548% | 42.4097 |
|  | [CITY=CHICAGO] ===> [SUBSTR_2_2_ZIPCODE=6] | 1.5335% | 99.3548% | 10.7280 |
|  | [CITY=CHICAGO]+[STATE=IL] ===> [SUBSTR_0_0_ZIPCODE=6] | 1.5452% | 100.0000% | 8.8379 |
|  | [CITY=CHICAGO]+[STATE=IL] ===> [SUBSTR_0_1_ZIPCODE=60] | 1.5452% | 100.0000% | 17.0886 |
|  | [CITY=CHICAGO]+[STATE=IL] ===> [SUBSTR_0_2_ZIPCODE=606] | 1.5335% | 99.3548% | 61.9024 |
| 10 | [CITY=CHICAGO]+[STATE=IL] ===> [SUBSTR_1_1_ZIPCODE=0] | 1.5452% | 100.0000% | 7.0541 |
|  | [CITY=CHICAGO]+[STATE=IL] ===> [SUBSTR_1_2_ZIPCODE=06] | 1.5335% | 99.3548% | 42.4097 |
|  | [CITY=CHICAGO]+[STATE=IL] ===> [SUBSTR_2_2_ZIPCODE=6] | 1.5335% | 99.3548% | 10.7280 |
|  | [STATE=CA] ===> [SUBSTR_0_0_ZIPCODE=9] | 8.1647% | 100.0000% | 9.5899 |
|  | [STATE=CA] ===> [SUBSTR_0_1_ZIPCODE=90 OR 94] | 3.7883% | 46.3980% | 12.2479 |
| 15 | [STATE=CA] ===> [SUBSTR_0_0_ZIPCODE=0 OR 4] | 3.7883% | 46.3980% | 1.8418 |
|  | [STATE=CT] ===> [SUBSTR_0_0_ZIPCODE=0] | 1.9639% | 99.4949% | 10.0507 |
|  | [STATE=CT] ===> [SUBSTR_0_1_ZIPCODE=06] | 1.9639% | 99.4949% | 50.6616 |
|  | [STATE=CT] ===> [SUBSTR_1_1_ZIPCODE=6] | 1.9639% | 99.4949% | 13.1493 |
|  | [STATE=FL] ===> [SUBSTR_0_0_ZIPCODE=3] | 2.6617% | 99.6269% | 11.5533 |
| 20 | [STATE=GA] ===> [SUBSTR_0_0_ZIPCODE=3] | 2.4624% | 100.0000% | 11.5965 |
|  | [STATE=GA] ===> [SUBSTR_0_1_ZIPCODE=30] | 1.8044% | 73.2794% | 40.6113 |
|  | [STATE=GA] ===> [SUBSTR_1_1_ZIPCODE=0] | 1.8044% | 73.2794% | 5.1692 |
|  | [STATE=IL] ===> [SUBSTR_0_0_ZIPCODE=6] | 8.1148% | 99.5110% | 8.7947 |
|  | [STATE=IL] ===> [SUBSTR_0_1_ZIPCODE=60 OR 61] | 7.5068% | 92.0538% | 12.2628 |
| 25 | [STATE=IL] ===> [SUBSTR_0_2_ZIPCODE=606] | 1.6050% | 19.6822% | 12.2628 |
|  | [STATE=IL] ===> [SUBSTR_1_1_ZIPCODE=0 OR 1] | 7.5068% | 92.0538% | 4.0217 |
|  | [STATE=IL] ===> [SUBSTR_1_2_ZIPCODE=06] | 1.6050% | 19.6822% | 8.4013 |
|  | [STATE=IL] ===> [SUBSTR_2_2_ZIPCODE=1 OR 6] | 3.8182% | 46.8215% | 1.9360 |
|  | [STATE=IN] ===> [SUBSTR_0_0_ZIPCODE=4] | 3.6686% | 99.4595% | 4.6817 |
| ... | | | | |

| RULE | | SUPPORT | CONFIDENCE | LIFT |
|---|---|---|---|---|
| 1 | [CITY==CHICAGO] ===> [ZIPCODE matches ^606.*] | 1.5352% | 99.3548% | 61.9024 |
| | [STATE==CA] ===> [ZIPCODE matches ^9.*] | 8.1647% | 100.0000% | 9.5899 |
| | [STATE==CT] ===> [ZIPCODE matches ^06.*] | 1.9639% | 99.4950% | 50.6616 |
| | [STATE==FL] ===> [ZIPCODE matches ^3.*] | 2.6617% | 99.6269% | 11.5533 |
| 5 | [STATE==GA] ===> [ZIPCODE matches ^3.*] | 2.4624% | 100.0000% | 11.5965 |
| | [STATE==IL] ===> [ZIPCODE matches ^6.*] | 8.1148% | 99.5110% | 8.7947 |
| | [STATE==IL] ===> [ZIPCODE matches ^6[01].*] | 7.5068% | 92.0538% | 12.2628 |
| | [STATE==IN] ===> [ZIPCODE matches ^4.*] | 3.6686% | 99.4595% | 4.6817 |
| | [STATE==MA] ===> [ZIPCODE matches ^0.*] | 2.9608% | 100.0000% | 10.1017 |
| 10 | [STATE==MI] ===> [ZIPCODE matches ^4[89].*] | 8.5934% | 100.0000% | 11.6234 |
| | [STATE==MN] ===> [ZIPCODE matches ^5.*] | 1.9938% | 99.5025% | 13.2551 |
| | [STATE==MO] ===> [ZIPCODE matches ^6.*] | 1.7346% | 100.0000% | 8.8379 |
| | [STATE==NC] ===> [ZIPCODE matches ^2.*] | 2.5122% | 100.0000% | 13.2510 |
| | [STATE==NJ] ===> [ZIPCODE matches ^0.*] | 3.3197% | 100.0000% | 10.1017 |
| 15 | [STATE==NY] ===> [ZIPCODE matches ^1.*] | 5.0244% | 99.4083% | 9.1232 |
| | [STATE==OH] ===> [ZIPCODE matches ^4[345].*] | 7.6563% | 99.8700% | 13.0442 |
| | [STATE==PA] ===> [ZIPCODE matches ^1.*] | 5.6226% | 100.0000% | 9.1775 |
| | [STATE==TN] ===> [ZIPCODE matches ^3.*] | 1.7546% | 100.0000% | 11.5965 |
| | [STATE==TX] ===> [ZIPCODE matches ^7.*] | 5.9216% | 100.0000% | 11.0474 |
| 20 | [STATE==VA] ===> [ZIPCODE matches ^2.*] | 1.8144% | 100.0000% | 13.2510 |
| | [STATE==WI] ===> [ZIPCODE matches ^5.*] | 3.6686% | 99.7290% | 13.2853 |

US 8,171,001 B2

USING A DATA MINING ALGORITHM TO GENERATE RULES USED TO VALIDATE A SELECTED REGION OF A PREDICTED COLUMN

BACKGROUND OF THE INVENTION

1. Field

The present invention relates to a method, system, and article of manufacture for using a data mining algorithm to generate rules used to validate a selected region of a predicted column.

2. Description of the Related Art

Data records in a database may be processed by a rule evaluation engine applying data rules to determine data records that have column or field values that deviate from the values that are expected by the rules. In the current art, the user manually codes data rules by first analyzing the data visually or using a profiling tool to obtain an understanding of the pattern of a well-formed record. Next a user builds logical expressions that define a set of rules to describe the normal characteristics of records in the set. These rules are then repeatedly executed against data sets to flag records that fail the conditions specified by the data rules and report on trends in failure rates over time.

A user may use a rule editor user interface to create new data rules or modify existing rules. Rules may be expressed in a rule language, such as BASIC, the Structured Query Language (SQL), Prolog, etc. The user may then save rules in a rule repository in the rule language or in a common rule format. The user may then select rules from the rule repository and a data set of records to provide to the rule evaluation engine to execute the selected rules against the selected data records to validate the data, capture the results and display the results to the user.

Developing data rules can require a significant amount of user time, effort and skill to analyze patterns in data, especially for large data sets having millions of records with hundreds of columns. Also one cannot often design data rules for records that have non-repeatable values. If the values in the analyzed columns are unique (in the case of a phone number for instance) or have a very high cardinality (in the case of the Zip code for instance), then the values of such columns cannot be predicted from values in other columns. The only way to detect data errors involving wrong values in subparts of such values is either to write all possible rules manually (this can be a very tedious task if the number of necessary rules is high), or use a more complex data flow that validates the whole value against valid values in a look-up database (this could be done to validate a zip code, but would be difficult to validate a phone number or a SSN), or, alternatively, validate the whole against a lookup-table that records invalid values (for example, 9999999999 is known to be an invalid US phone number).

There is a need in the art to provide improved techniques for generating and using rules to validate data in columns.

SUMMARY

Provided are an article of manufacture, system, and method for using a data mining algorithm to generate rules used to validate a selected region of a predicted column. A data set has a plurality of columns and records providing data for each of the columns. Selection is received of at least one predicted column for which rules are to be generated and at least one region of the selected at least one predicted column, wherein each region specifies data positions in the column. The data set is processed to determine association relationships among data in at least one predictor column and subsequences in the selected at least one region of the at least one predicted column. At least one rule is generated from the relationships specifying a condition involving at least one predictor column that predicts at least one value in the selected region of the at least one predicted column.

In a further embodiment, an association rules model is used to generate the rules for the values in the at least one predictor column and subsequences in the at least one selected region. The at least one selected region comprises an n-gram in the at least one predicted column and the at least one rule specifies an association of the value in at least one predictor column with N-grams of the selected region in the predicted column.

In a further embodiment, generating at least one rule comprises generating at least one rule providing an association of at least one condition involving the at least one predictor column and a subsequence in the selected region.

In a further embodiment, the columns in the data set are pivoted by creating one record in a pivoted data set for each value in the at least one predictor column in a record and one record for each possible subsequence of values in the region of the predicted column, wherein the generated rules associate column values in the records of the pivoted data set.

In a further embodiment, multiple rules are generated to associate values in the at least one predictor column with subsequences in the selected at least one region. Rules are removed that do not specify at least one condition for at least one predictor column that predicts a subsequence in the selected at least one region of the at least one predicted column.

In a further embodiment, multiple rules are generated to associate conditions in the at least one predictor column with subsequences in the selected at least one region. A determination is made of rules having a same at least one predictor condition and different subsequences in the selected region of a same predicted column and the determined rules are merged into a merged rule containing the different subsequences.

In a further embodiment, a determination is made as to whether a sum of confidence levels for the determined rules having the same at least one predictor condition exceeds a minimum confidence level, wherein the determined rules are merged into the merged format rule in response to determining that the sum of the confidence levels exceeds the minimum confidence level.

In a further embodiment, multiple rules are generated to associate conditions in the at least one predictor column with subsequences in the selected region. Any rules that do not satisfy a minimum confidence level are deleted.

In a further embodiment, multiple rules are generated to associate conditions in the at least one predictor column with subsequences in the selected region. A determination is made as to whether a first rule having a same at least one predictor condition as a second rule and whether the determined first rule includes a first subsequence that is a subset of a second subsequence predicted in the second rule. The determined first rule is deleted in response to determining that the first subsequence is the subset of the second subsequence.

In a further embodiment, a determination is made as to whether the second rule satisfies a minimum confidence level. The first rule is deleted in response to determining that the second rule satisfies the minimum confidence level and the second rule is deleted in response to determining that the confidence level of the second rule does not satisfy the minimum confidence level. The first rule is retained in response to determining that the confidence level of the second rule does not satisfy the minimum confidence level and that the first rule satisfies the minimum confidence level.

In a further embodiment, a determination is made as to whether the confidence level of the first rule does not exceed the confidence level of the second rule by a threshold. The first rule is deleted in response to determining that the second rule satisfies the minimum confidence level and the confidence level of the first rule does not exceed the confidence level of the second rule by the threshold.

In a further embodiment, multiple rules are generated to associate conditions in the at least one predictor column with subsequences in the at selected at least one region. The generated rules are filtered to determine a filtered set of rules and the filtered set of rules is converted into data validation rules to apply to records in a data set. Each rule specifies that if a condition in at least one predictor column is satisfied, then the subsequence in the predicted column of the record matches the specified subsequence.

In a further embodiment, the predictor column comprises the predicted column, and wherein the relationship is determined for data in a region of the predictor column and subsequences from the same predicted column.

BRIEF DESCRIPTION OF THE DRAWINGS

FIGS. 7-13 illustrate an example of how data records in a data set are processed to generate rules and then to filter and convert the rules into a set of data validation rules.

DETAILED DESCRIPTION

Figure 1:
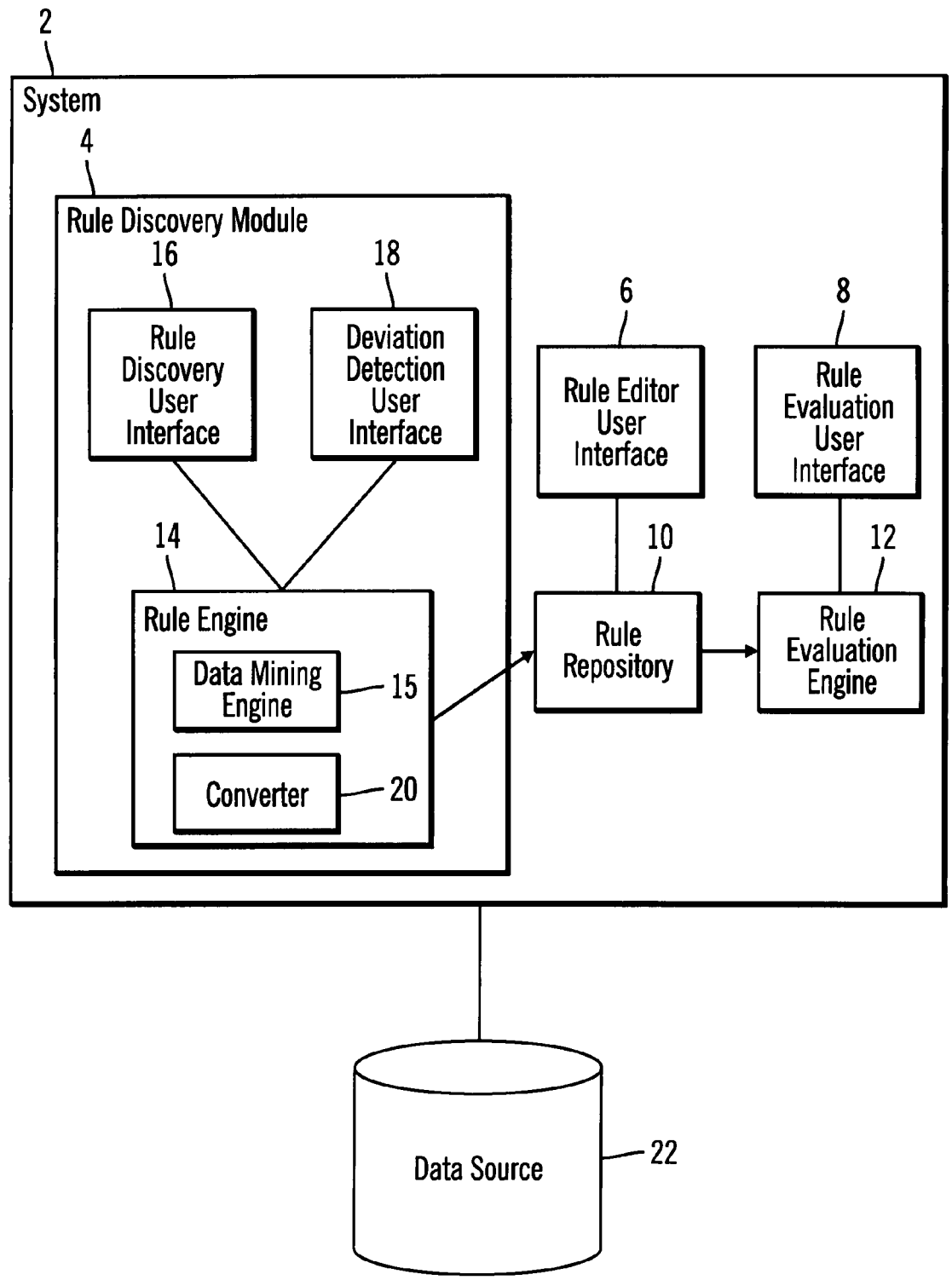
FIG. 1 illustrates an embodiment of a computing environment.

FIG. 1 illustrates a computing environment in which embodiments may be implemented. A system 2 includes program components comprising a rule discovery module 4, a rule editor user interface 6, a rule evaluation user interface 8, a rule repository 10, and a rule evaluation engine 12. The rule discovery module 4 includes a rule engine 14 including a data mining engine 15 and a converter 20, a rule discovery user interface 16, and a deviation detection user interface 18. The program components in the system 2, including components 4, 6, 8, 10, 12, 14, 15, 16, 18, and 20 may comprise software components that are loaded into a computer readable memory in the system 2 and executed by one or more processors of the system 2. Alternatively, groups of one or more of the components 4, 6, 8, 10, 12, 14, 15, 16, 18, and 20 may be on different systems having different processors and memory. Yet further, the system 2 may comprise multiple processors or distributed processes that execute the components 4, 6, 8, 10, 12, 14, 15, 16, 18, and 20. The system is further coupled to a data source 22 that contains records and fields, where the records may have one or more fields. The data source 22 may be implemented in a computer readable medium, such as a storage device.

The rule discovery module 4 is invoked to automatically generate data rules that validate the values of data records in a table in the data source 22. The data rules indicate one or more conditions for one or more predictive fields that infer within a defined confidence and support level predicted conditions of one predicted field. A predictor condition for a predicted column may specify a value, a range of values or specific values for a predicted field, e.g., age<18, salary>=40000, profession is in {a, b, c}, or other condition types known in the data mining art. These rules may then be applied to data sets to determine column values that deviate from the rules and thus may be erroneous.

The rule engine 14 applies one or more data mining engines 15 implementing a data mining algorithm to a data set of records to determine data rules for the data. The data mining algorithm determines rules that specify a predicted condition for fields based on one or more predictor conditions in other fields. In one embodiment, the data mining algorithm comprises an association rules algorithm. The converter 20 may further convert data rules in the model language of the algorithm, such as the Predictive Model Markup Language (PMML), into a common rule model language, such as a data validation language. The rule repository 10 may store rules in a common rule format, even if the rules were generated in different formats from different rule algorithms. The rule repository 10 may be implemented in a storage device coupled to the system 2 or the memory of the system 2.

The rule discovery user interface 16 provides a user interface to a user that allows the user to specify parameters for the rule engine 14, such as a minimum confidence level, minimum support level, minimum lift, and maximum rule length for generated rules and one or more data mining algorithms for the rule engine 14 to use. A confidence level indicates a minimum probability at which one or more predictor conditions from predictive fields infer the predicted condition for the predicted field, i.e., the certainty in the records that are analyzed by the rule engine 14 that one or more fields predict a condition in another field. A support level indicates a minimum number or percentage of records of the analyzed records that must satisfy the determined data rule. A minimum lift value may be of the form lift $(A \rightarrow C)$=confidence$(A \rightarrow C)$/support$(C)$, providing a measure of interest in the rule. Lift values greater than 1.0 indicate that transactions containing A tend to contain C more often than all transactions, whether they contain A or not.

The deviation detection user interface 18 presents to the user those records in the analyzed data set used to produce the data rules that deviate from, i.e., do not satisfy, the rules. This allows the user to review and consider the extent to which the data rules are correctly identifying erroneous data or incorrectly identifying correct records as deviant.

The rule discovery module 4 thus automatically determines data rules for a data set with a confidence metric that measures how strongly the rules are supported by the data sets.

The rule engine 14 provides the generated data rules to a rule repository 10. A rule editor user interface 6 allows the user to edit, modify and delete the generated data rules. For instance, the user may inspect data records that deviate from the generated data rules in the deviation detection user interface 18 and then edit the generated rules in the rule editor user interface 6 based on an analysis of the deviant records and logic of the generated data rules.

The user may use the rule evaluation user interface 8 to select a rule or set of rules from the rule repository to execute against data sets in the data source 22 having records to which the selected rules apply. The selected rules are loaded from the rule repository 10 to a rule evaluation engine 12 which executes the rules against selected tables and records from the data source 22, capturing results and analysis which are displayed to the user via the rule evaluation user interface 8. Upon the rule evaluation engine 12 identifying deviant records, the evaluation engine 12 may apply automatic corrections to the data or present deviant records to the user to review and edit.

The user interfaces 6, 8, 16, and 18 may be implemented in a graphical user interface or through a command line interface in which the user enters textual commands to control the rule engine 14, rule repository 10 and rule evaluation engine 12.

The data mining engine 15 may utilize a data mining association rules algorithm to generate data rules from a data set of records. An example of such an algorithm is the APRIORI algorithm or the algorithm described in U.S. Pat. No. 5,615, 341. These algorithms may produce association rules models as defined in the PMML standard. An association rules model contains rules that express an association between items occurring together in a same transaction. For instance, the association algorithm may receive as an input two columns, one for the transaction identifiers (IDs) and one for the items. The association algorithm then searches for all relationships between the items, making no assumptions on the content of the analyzed items, treating them only as strings. In certain embodiments, the association algorithm may also detect the relationship between the conditions of columns of a table. The data mining engine 15 may then assume that each row in the table is a transaction and generate one item "COL=val" for each column, which is then passed to the association algorithm. The data rules generated by data mining association rule algorithms may follow the form of—if <condition> then <format test>, where <format test> is an expression that tests the data format for a column. The data mining engine 15 using a data mining association rules algorithm may generate all data rules that satisfy the specified confidence, support level, and lift.

Figure 2:
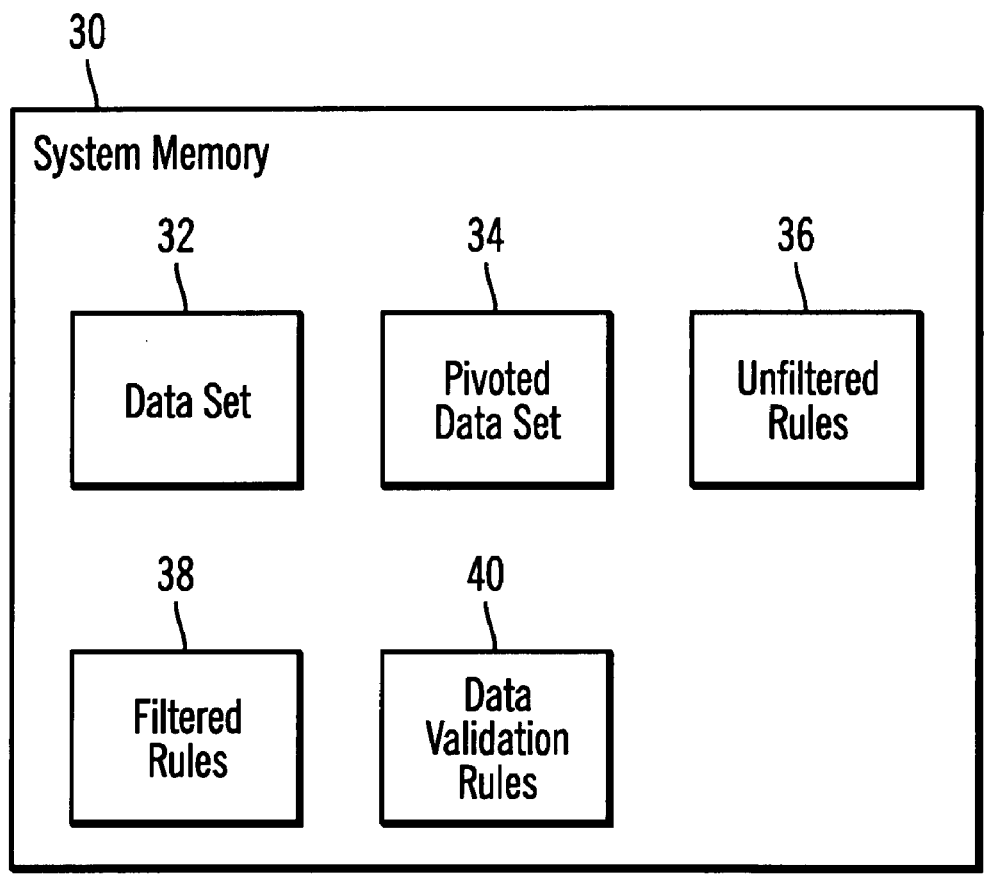
FIG. 2 illustrates an embodiment of information maintained in memory to generate data validation rules from a data set.

FIG. 2 illustrates an embodiment of the system 2 memory 30 including a source data set 32 which may comprise a table having multiple columns. In one embodiment, the user may select a region of one of the columns to predict, i.e., a predicted condition based on conditions in one or more other predictor columns. The predictor condition may comprise a discrete value, a range of values or a regular expression defining a set of values The selected region may indicate a subsequence of positions in the predicted column, e.g., the first n items in the predicted column, for instance the first n alphanumeric characters/digits in the predicted column. In certain embodiments, the rule engine 14 may generate rules that predict values for all possible subsequences in the selected region based on conditions in one or more of the predictor columns. For instance, rules may be generated that predict all possible N-grams of values in the selected region, where each N-gram comprises a subsequence of items from the sequence or the selected region.

In one embodiment, the rules engine 14 may preprocess the data set 32 before applying the data mining engine 15 to generate the rules by generating a pivoted data set 34 having two column records. One pivoted row may be generated in the pivoted data set 34 for each column in the data set 34 and each possible subsequence of the selected region. The data mining engine 14 may generate a set of unfiltered rules 36 from the pivoted data set 34 and the rule engine 14 may further process the unfiltered rules 36 to generate a set of filtered rules 38 by removing unnecessary rules, consolidating rules, and removing rules that do not satisfy a specified confidence level, e.g., confidence, lift, support, etc. The filtered rules 38 may be processed into a rule format in a set of data validation rules 40 that may be applied to a data set to validate the selected regions of the predicted columns in data sets.

Figure 3:
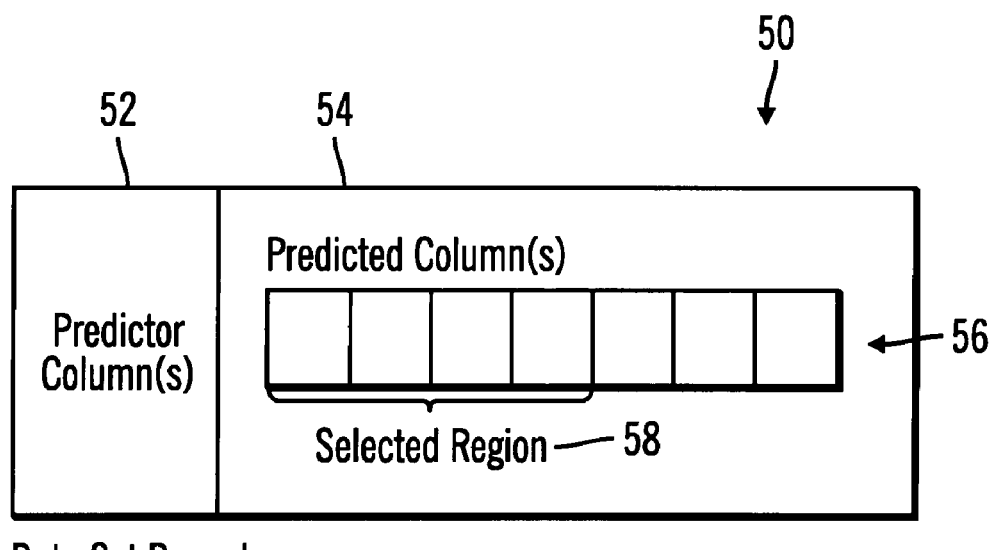
FIG. 3 illustrates an embodiment of columns in a data set record for which rules are generated.

FIG. 3 illustrates an embodiment of a data set record 50 in the source data set 32 as including one or more predictor columns 52 and one or more predicted columns 54. The predicted columns 54 include a value 56 having data positions for characters, symbols, digits, etc. The selected region 58 for which the rules are generated to predict comprises a subsequence of data positions in the value 56. In the embodiment of FIG. 3, the selected region 58 is shown as a sequence of the first n data positions in the value 56. In alternative embodiments, the selected region may comprise any sequence of one or more data positions in the value 56, including a sequence in the middle of the value 56 or at the end of the value 56, or comprising the entire value 56.

Figure 4:
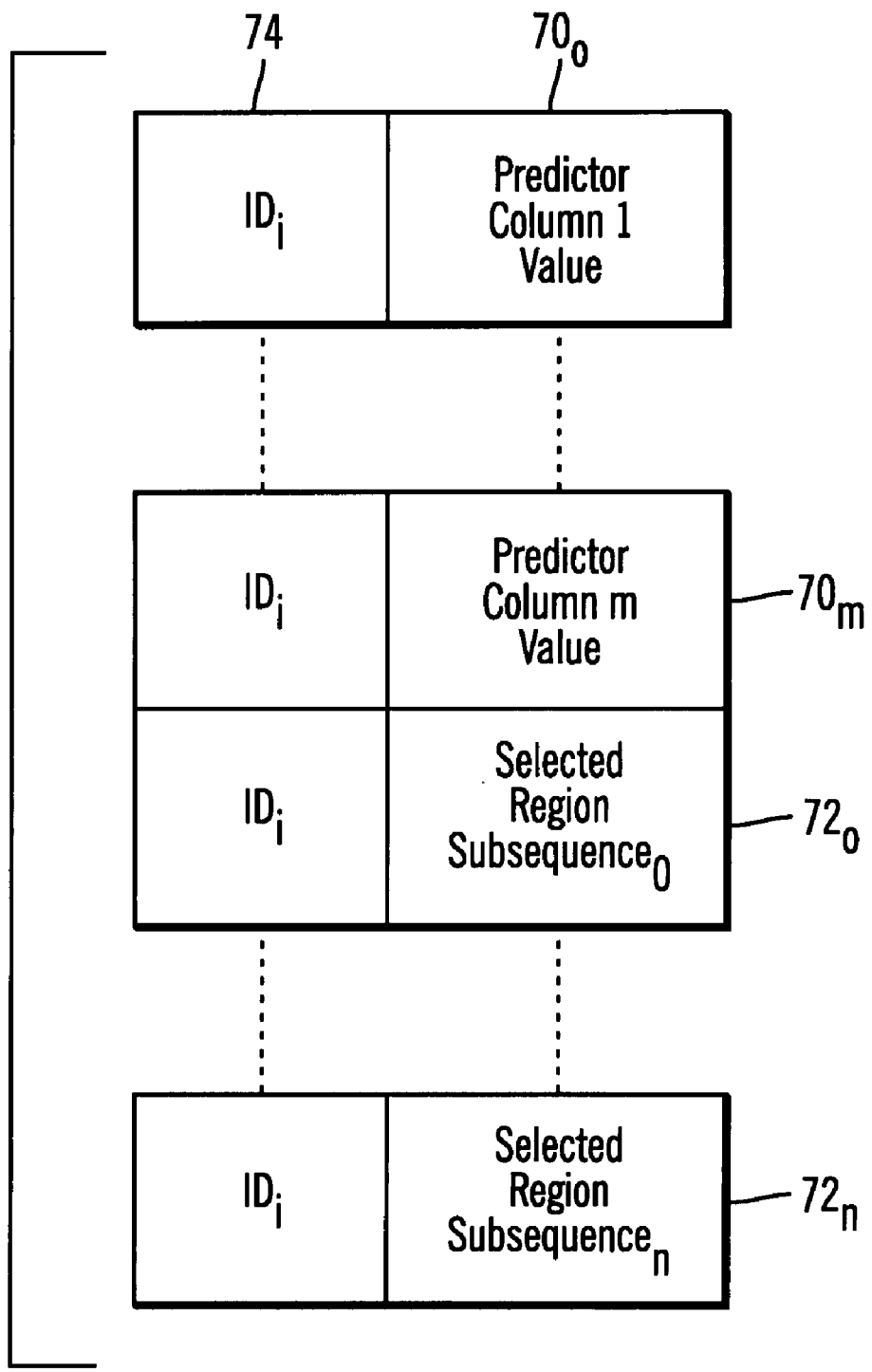
FIG. 4 illustrates an embodiment of a record in a pivoted data set.

FIG. 4 illustrates an embodiment of the format of the rows in the pivoted data set 34. For each record i in the data set 32, a record $70_0 \ldots 70_m$ is generated for each of the m predictor columns, where m may be any integer equal to or greater than one. Further, for each record i in the data set 32, a record $72_0 \ldots 72_n$ is generated in the pivoted data set 34 for each subsequence in the selected region 58, such as the value in each of the positions of the region 58. Each record $70_0 \ldots 70_m$, $72_0 \ldots 72_n$ in the pivoted data set 34 generated from the record i in the data set 32 includes a first column, e.g., 74, having the transaction ID identifying the record in the source data set 32 for which the record in the pivoted data set 34 was generated and the data from the column or subsequence of the region in the record in the pivoted data set 34.

Figure 5A:
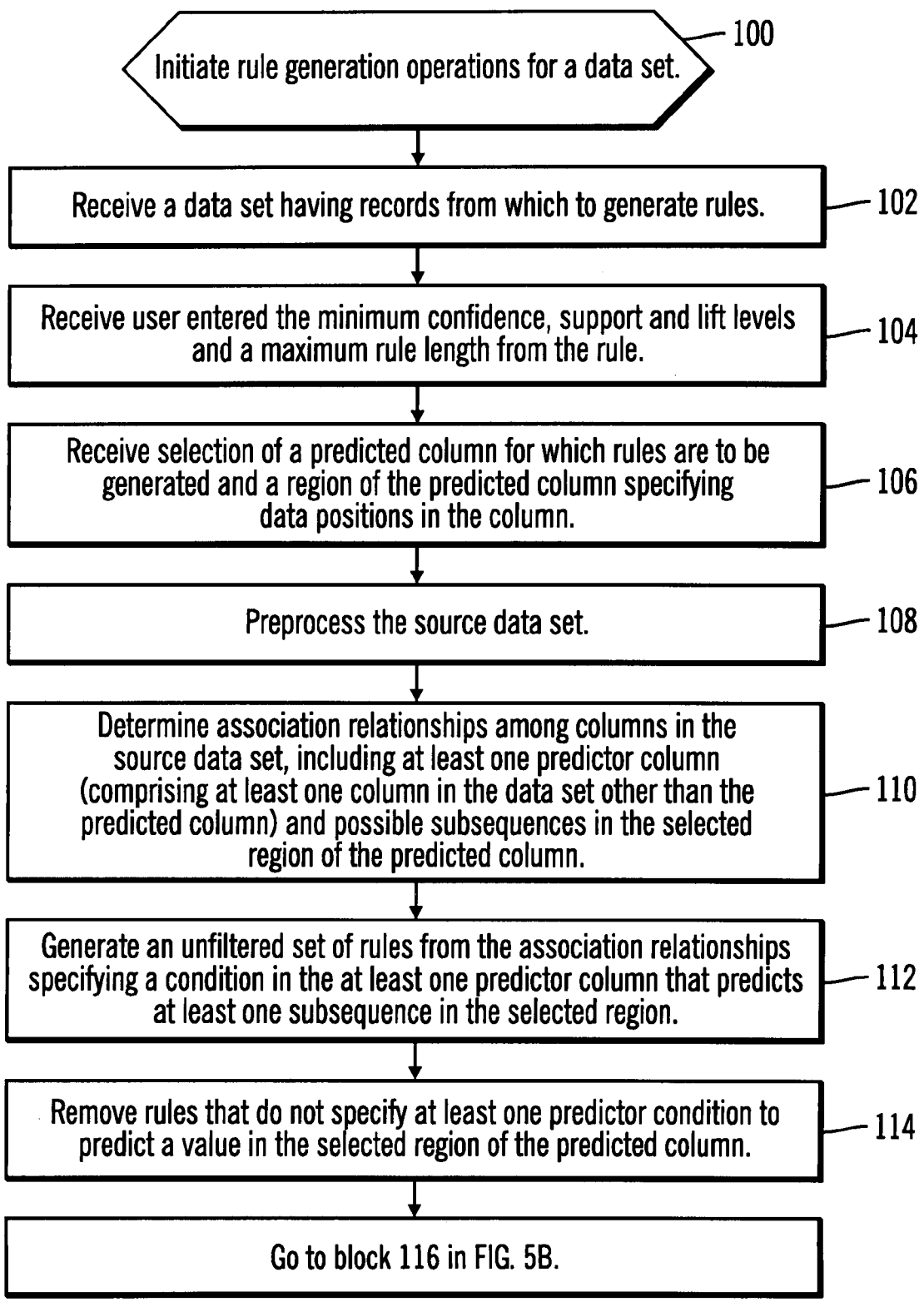
FIGS. 5a and 5b illustrate an embodiment of operations for generating rules to predict subsequences of a selected region of a predicted column.
Figure 5B:
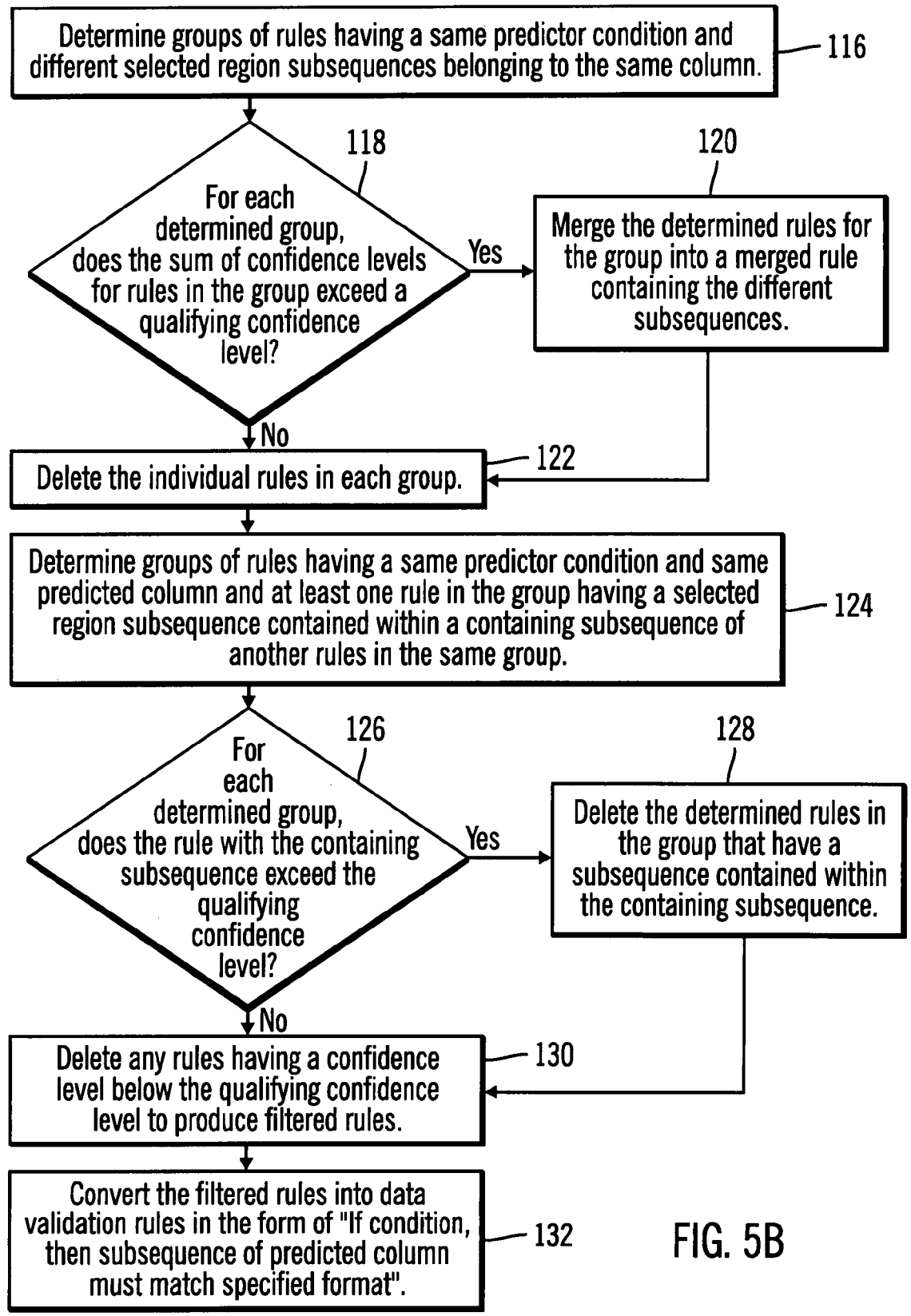

FIGS. 5a and 5b illustrate an embodiment of operations performed by the components of the system 2 to generate data rules from a data set 32 of records in the data source 22. Upon initiating (at block 100) rule generation operations, the rule engine 14 receives (at blocks 102) a data set having records from which to generate rules. The rule engine 14 may further receive (at block 104) the minimum confidence, support and lift levels and a maximum rule length from the rule discovery user interface 16. The minimum confidence level, which may be specified by the user, is a confidence level that the final rules must satisfy, and may be set to a relatively high value, e.g., 90%. The data mining engine 15 may use a low minimum confidence level that is used for generating the unfiltered rules 36 to capture patterns where one condition may lead to different formats. This low minimum confidence level used by the data mining engine 15 to generate the initial rules to consider may be substantially lower, e.g., 5%, than the minimum confidence level specified by the user for the final rule set. This initial rules set is further processed to generate final consolidated rules, each having a confidence level that satisfies the user specified or default minimum confidence level. This low minimum confidence level may be a predefined variable for the data mining engine 15 which the user does not set. The initially generated unfiltered rules 36 may satisfy the low minimum confidence level. The rule engine 14 may further receive (at block 106) selection of a predicted column 52 for which rules are to be generated and a selected region 58 for each predicted column 54 specifying data positions in the column 54.

Figure 6:
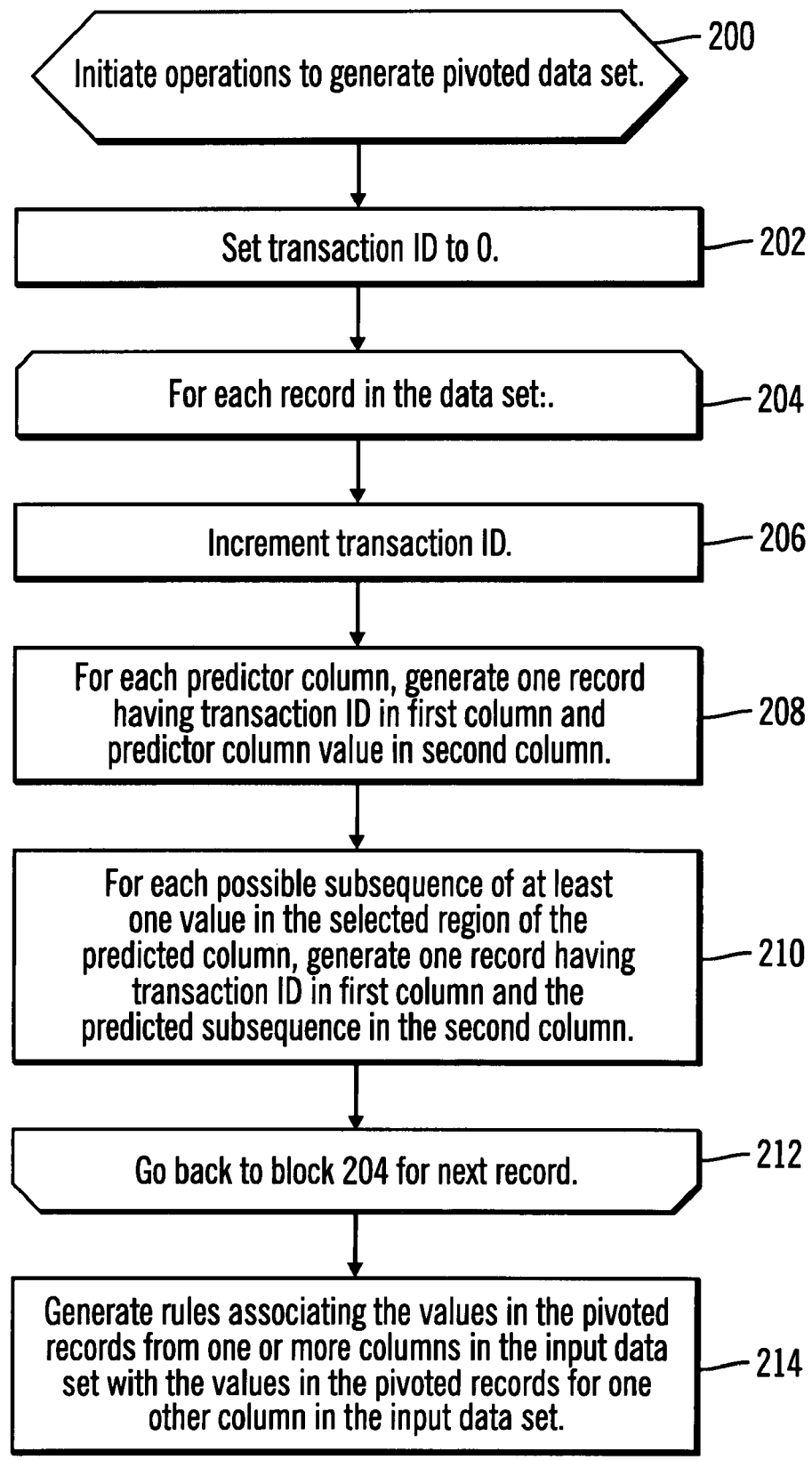
FIG. 6 illustrates an embodiment of operations to generate a pivoted data set from which the rules are generated.

The rule engine 14 may then preprocess (at block 108) the data set 32 before the data mining engine 15 extracts the association rules. Preprocessing the data set 34 may involve discretization, which converts values in numeric columns, such as values in the relationship column, to a range of values for processing. Preprocessing may further involve pivoting the data records in the received data set if the data mining engine 15 used requires pivoted data. FIG. 6 illustrates an embodiment of operations to preprocess the data set 32 to generate a pivoted data set 34 from which the rules are generated. For instance, if the data mining engine 15 comprises an association rules algorithm, then the preprocessing operation may involve pivoting the table in a two columns format (transaction ID, item) where each item is "COL=value" and where the numeric values are discretized.

The data mining engine 15 applies (at block 110) a data mining algorithm to determine association relationships among data in the columns of the data set and subsequences, including the predictor column 52 and the subsequences in the selected region 58 of the predicted column 56. The rule engine 14 then generates (at block 112) an unfiltered set 36 of rules from the association relationships specifying a condition in the at least one predictor column 52 that predicts at least one subsequence in the selected region 58. The conditions for the predictor column(s) 52 may comprise a discrete value, a range of values or a regular expression defining a set of values. The rules may be in the PMML model format. Further, the predictor column may be the same column as the predicted column or a different column. Further, if the predictor column is the same as the predicted column, then the predictor column may comprise a region of the column instead of the entire column. Further, in situations where the predictor column is a different column from the predicted column, the rules may be determined from a region of the predictor column or the entire predictor column value.

In one embodiment, the data mining engine 15 builds an association rules model with the appropriate parameters and filter conditions to configure a low minimum confidence to maximize the number of possible mask format patterns captured for a particular relationship column condition. Using a low confidence to increase the number of rules generated increases the number of rules that are generated to capture how values in the format column may be recorded in slightly different formats. Each slightly different format in how the value is recorded may result in a different rule in the association rules model. Building a model with low minimum confidence will capture these different variations so they can be merged later into one rule with the same condition and a confidence measure derived from the confidence of each rule. Thus, the data mining engine 15 provides confidence, support, and lift for each generated rule to use when determining which rules to discard At blocks 114 through 130, the rules engine 14 performs operations to remove and consolidate rules from the unfiltered rules 36 to generate filtered rules 38. At block 114, the rules engine 14 removes rules that do not specify at least one predictor column 52 condition to predict a subsequence in the selected region 58 of the predicted column 56. Thus, at block 114, irrelevant rules are removed that do not predict a subsequence in the selected region 58 of interest of the predicted column 56.

With respect to FIG. 5*b*, to determine whether to merge rules, the rule engine 14 determines (at block 116) groups of rules having a same predictor condition and different predicted region values for the same column. For each determined group, if (at block 118) the sum of the confidence levels for rules in the group exceeds the minimum confidence level specified by the user, then the determined rules for the group are merged (at block 120) into a merged rule containing the different region values. In one embodiment, the subsequence from the merged rules having the same predictor condition 52 may be logically OR'd. From the no branch of lock 118 and from block 120, the rules engine 14 deletes (at block 122) the individual rules in each group.

The rules engine 14 may further determine (at block 124) groups of rules having a same predictor condition and the same predicted column and at least one rule in the group having a subsequence contained within a subsequence in the selected region 58 of another rule in the same group. A subsequence of the selected region 58 in one rule is contained within the subsequence value of another rule if the subsequence of the contained rule is a subset of the subsequence value of the containing rule. For each determined group, the rules engine 14 determines (at block 126) whether the rule with the subsequence containing the subsequence of other rules in the group, having the same predictor column 52 condition, exceeds the minimum confidence level. In other words, does the rule in which the other rules having the same predictor condition will be consolidated satisfy the minimum confidence level. If so, then the rules engine 14 deletes (at block 128) the determined rules in the group that have a subsequence value contained within the containing subsequence value.

In a further embodiment, before deleting the more specific rule in favor of the generated broader rule, a comparison may be made of the confidence level of the rule to remove and the consolidated rule. If the differential confidence level exceeds a threshold, i.e., is significant, then the generated broader rule may be removed. If the difference in the confidence levels does not exceed the threshold, than the rule may be kept. For instance, in FIG. 12, with respect to rules 23 and 24, both rules are above the minimum confidence (90%) and rule 24 predicts a broader region as rule 23, but its confidence is only 92% vs. nearly 100%. In one scenario, for rule 23, the confidence of the specialized rule is significantly better so that the rule will be kept.

Further, from block 128 or the no branch of block 126, the rules engine 14 deletes (at block 130) any remaining rules having a confidence level below the user specified minimum confidence level to produce the filtered rules 38. The converter 20 may convert (at block 132) the filtered rules 38 into data validation rules 40 in the form of "If condition, then the subsequence in the selected region 58 of the predicted column must match the subsequence value of the rule". The final rules to be generated to the user may be of the type: "If condition, then predicted column must match format", where the format to match is determined from the possible values in the selected regions found in the rules. For instance, the converter 20 may read the rules, which may be in a rule model format such as PMML, obtained by mining, extract the information contained in them and convert that to the model or language used to define the data validation rules, i.e., the common rule format.

In certain situations, the rules engine 14 may not discover any rules that satisfy the specified minimum confidence level. In such case, the rules engine 14 may return a message indicating that there were no rules discovered that satisfy the user specified minimum confidence level.

In further embodiments, the data mining engine 15 may further apply the qualifying rules to identify records, from the data set or a compatible data set that was processed to generate the data rules that do not satisfy the rules, i.e., deviate from the generated rules. The deviation detection user interface 18 may then present the determined deviant records to the user to review. This allows the user to analyze whether the rules are appropriately identifying deviant records and to determine rules that may be needed. Further, the rule editor user interface 6 enables the user to review, edit, delete and modify rules in the rule repository 10. The user may further use the rule editor user interface 6 to store the user edited set of data rules in the rule repository 10.

FIG. 6 illustrates an embodiment of operations performed by the rule engine 14 to preprocess the data set 32, such as performed at block 108 in FIG. 5a, to generate a pivoted data set 34 on which the data mining is performed to generate the rules. Upon initiating (at block 200) operations to generate the pivoted data set 34, the rule engine 14 sets (at block 202) a transaction identifier (ID) identifying a record in the data set 32 to zero. For each record 50 (FIG. 3) in the data set 32, the rule engine 14 performs a loop at blocks 204 through 212. At block 206, the transaction ID is incremented. For each predictor column 52, the rule engine 14 generates (at block 208) one record 50 having the transaction ID in the first column, e.g., 74, and the predictor column 52 value in the second column of the pivot data record $70_0 \ldots 70_m$. For each possible $subsequence_0 \ldots subsequence_n$ (e.g., all possible N-grams) of at least one value in the selected region 58 of the predicted column 52, the rule engine 14 generates (at block 210) one record $72_0 \ldots 72_n$ having the transaction ID in the first column and the predicted subsequence value in the second column. The data mining engine 15 then generates (at block 214) rules associating the values in the pivoted records from one or more columns in the input data set with the values in the pivoted records for one other column in the input data set.

FIG. 7 illustrates a sample data set 300 having seven columns. One of these columns "ZIPCODE" contains U.S. postal codes which are all coded in a 5-digits format. The user may define the selected region 58 as any of the five digits, such as the first three digits of the ZIP code, that are of interest to determine the impact values in other columns (such as CITY, or STATE) may have on the selected region, e.g., first three digits, of the ZIPCODE column.

FIG. 8 illustrates an example of a pivoted data set 302 resulting from pivoting the data set 300 in FIG. 7. Each row in the input data set 300 produces several rows in the output pivoted data set 302. The TRANSID column identifies the records in the data set 300 from which the column data is supplied. For instance, all items having "TRANSID 1" have been generated from the first row of the input data set 300. A record is generated in the pivoted data set 302 for each predictor column value, such as CITY, STATE, SITE ID, ORDER ID, etc., under the form <col>=<val>. Further one record is generated in the pivoted data set 32 for each possible N-gram of the first three digits of the predicted ZIPCODE column. In FIG. 8, the item "SUBSTR_0_0_ZIPCODE=4" indicates that the first digit (start index=0 and end index=0) for the column ZIPCODE is "4", the item "SUBSTR_1_2_ZIPCODE=95" indicates that the 2nd and 3rd digits (start index=1 and end index=2) for the column ZIPCODE is "95", the item SUBSTR_0_2_ZIPCODE=495" indicates that the first 3 digits (start index=0 and end index=2) for the column ZIPCODE is "495".

FIG. 9 illustrates an example of the unfiltered rules 304 comprising association rules obtained from the pivoted data shown in FIG. 8 when a data mining algorithm is applied. For instance, Rule 1 indicates that whenever STATE=MI, the 1st digit of ZIPCODE is 4 with a confidence of 100%, a support of 8.6% and a lift of 4.7; Rule 2 indicates the same information in the other direction (40% of the ZIPCODES starting with "4" are associated to the state MI), etc.

FIG. 10 illustrates an example of removing rules from the unfiltered rules 304 that do not provide a useful prediction, such as at block 114 in FIG. 5a, where the rules in bold face are those that remain and those not in bold face are removed. For instance, rules 2 and 3 do not predict a subsequence of the selected region of the ZIPCODE and rule 20 predicts the 2 first digits of the selected ZIP code region, but uses the second digit of the selected region as the predictor, so this rule is deleted.

FIG. 11 illustrates an example of merging rules having the same predictor column(s) 52 value(s) and different selected region subsequences for the same predicted column, such as performed at blocks 116-120 in FIG. 5b. For instance, rules 14 and 15 predict that if the state is CA, then the two first digits of the zip code are 90 or 94. Rules 14 and 15 may be merged into a single rule 16. Similarly, rules 17 and 18 may be merged into a single rule 19. All rules in bold face are rules that remain, those not in bold face are removed to further filter the rules set.

FIG. 12 illustrates an example of removing redundant rules that have the same predictor conditions and a selected region subsequence contained within another selected region subsequence for the same predicted column, such as performed at blocks 124-128 in FIG. 5b. The rules shown in bold remain and the other rules are removed. For instance, rules 1, 2, 4, 5, and 6 are removed because Rule 3 has the same predictor condition of Chicago and predicts a larger subsequence of the predicted column with a confidence which is not significantly lower. Similarly, rules 7, 8, 10, 11 and 12 are removed because rule 9 has the same predictor condition of Chicago and IL and predicts a larger subsequence of the ZIPCODE. However, rule 9 is itself removed because it predicts the same thing as rule 3 and its predictor condition is a superset of the predictor condition of rule 3 while its confidence is not better, i.e., rule 9 is a complex variant of rule 3 without any additional information. Rule 15 is redundant because it is a specialization of rule 14. However, rule 14 is removed because its confidence is below the minimum confidence set by the user in the filter parameters. Rule 18 is removed because rule 17 predicts a larger subsequence with the same predictor condition. Rule 22 is removed because rule 21 predicts a larger subsequence of the predicted selected region with the same predictor condition of GA. Rule 19 is removed too because its confidence is below a minimum confidence. Rules 25-28 are removed because they are specializations of rules 23 and 24 or their confidence is below the minimum confidence. Rule 23 is retained although rule 24 predicts a larger subsequence of the selected region with the same predictor condition because the confidence of rule 24, although it is above the threshold set by the user, is significantly below the confidence of rule 23. In such case both rules may be kept. For instance, the more specialized narrower rule, predicting a narrower subsequence, is deleted in response to determining that the confidence level of the narrower rule does not exceed the confidence level of the second rule by a threshold, i.e., the confidence level of the narrower rule being considered for deletion is not significantly greater than the rule to be retained.

FIG. 13 illustrates a refined rule set 306 that results from consolidating and removing rules that are redundant or do not satisfy the minimum confidence level. The rules in FIG. 13 are further converted by the rule engine 14 or converter 20 to a data validation rule format or regular expressions. To convert to a regular expression, an asterisk (or other symbol) may be added following the subsequence to indicate that the remainder following the predicted subsequence may comprise any value. The carrot symbol "^" indicates the beginning of the column value.

For instance, a regular expression validating this prediction can be generated using the following expression:

$$\hat{}.\{startIndex\}(val1|val2).*$$

If a rule predicts that the 3rd and 4th digit of a column can be 12 or 34, then the corresponding regular expression will be "^.{2}(12|34).*", indicating that the 2 first digits or character of the value can by any digit/character (this is expressed by .{2} in the regular expression language) and that the next digits can be either 12 or 34.

The regular expression may further be optimized. For instance, if the 1st index of the predicted region is 1, the expression can be rewritten as "^.(val1|val2).*", indicating that the first digits/character can be any digit/character and that the following values can be 12 or 34 If the 1st index of the predicted region is 0, then the expression can be rewritten as "^(val1|val2).*". If the different possible values all start or end with the same characters or digits, e.g., the possible values for the 3rd, 4th and 5th digits are 100, 110 and 120, the expression can be rewritten as "^.{2}1[012]0.*".

With the described embodiments, a rule discovery program using a data mining engine may generate rules that predict a subsequence of a predicted column based on one or more predictor conditions from the data set. The discovered rules may be converted to a data validation format and stored in the rule repository 10 or used to validate the data in a region of a column.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5*a*, 5*b*, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium having code executed to cause operations, the operations comprising:

processing a data set having a plurality of columns and records providing data for each of the columns;

receiving selection of at least one predicted column for which rules are to be generated and at least one region of the selected at least one predicted column, wherein each region specifies data positions in the column;

processing the data set to determine association relationships among data in records in at least one predictor column from the data set and subsequences in the selected at least one region in records of the at least one predicted column, wherein the associations are determined between data in the records in the at least one predictor column and the subsequences of the selected at least one region in the records of the at least one predicted column; and generating at least one rule from the relationships specifying a condition based on the values in the records of the at least one predictor column that predicts at least one value in the selected region of the records in the at least one predicted column.

2. The article of manufacture of claim 1, wherein an association rules model is used to generate the rules for the values in the at least one predictor column and subsequences in the at least one selected region, and wherein the at least one selected region comprises an n-gram in the at least one predicted column, and wherein the at least one rule specifies an association of the value in at least one predictor column with N-grams of the selected region in the predicted column.

3. The article of manufacture of claim 1, wherein generating at least one rule comprises:

generating at least one rule providing an association of at least one condition involving the at least one predictor column and a subsequence in the selected region.

4. The article of manufacture of claim 3, wherein the operations further comprise:

pivoting the columns in the data set by creating one record in a pivoted data set for each value in the at least one predictor column in a record and one record for each possible subsequence of values in the region of the predicted column, wherein the generated rules associate column values in the records of the pivoted data set.

5. The article of manufacture of claim 1, wherein multiple rules are generated to associate values in the at least one predictor column with subsequences in the selected at least one region, and wherein the operations further comprise:

removing rules that do not specify at least one condition for at least one predictor column that predicts a subsequence in the selected at least one region of the at least one predicted column.

6. The article of manufacture of claim 1, wherein multiple rules are generated to associate conditions in the at least one predictor column with subsequences in the selected at least one region, and wherein the operations further comprise:

determining rules having a same at least one predictor condition and different subsequences in the selected region of a same predicted column; and merging the determined rules into a merged rule containing the different subsequences.

7. The article of manufacture of claim 6, wherein the operations further comprise:

determining whether a sum of confidence levels for the determined rules having the same at least one predictor condition exceeds a minimum confidence level, wherein the determined rules are merged into the merged format rule in response to determining that the sum of the confidence levels exceeds the minimum confidence level.

8. The article of manufacture of claim 1, wherein multiple rules are generated to associate conditions in the at least one predictor column with subsequences in the selected region, and wherein the operations further comprise:

deleting any rules that do not satisfy a minimum confidence level.

9. The article of manufacture of claim 1, wherein multiple rules are generated to associate conditions in the at least one predictor column with subsequences in the selected region, wherein the operations further comprise:

determining a first rule having a same at least one predictor condition as a second rule;

determining whether the determined first rule includes a first subsequence that is a subset of a second subsequence predicted in the second rule; and deleting the determined first rule in response to determining that the first subsequence is the subset of the second subsequence.

10. The article of manufacture of claim 9, wherein the operations further comprise:

determining whether the second rule satisfies a minimum confidence level, wherein the first rule is deleted in response to determining that the second rule satisfies the minimum confidence level;

deleting the second rule in response to determining that the confidence level of the second rule does not satisfy the minimum confidence level; and retaining the first rule in response to determining that the confidence level of the second rule does not satisfy the minimum confidence level and that the first rule satisfies the minimum confidence level.

11. The article of manufacture of claim 10, wherein the operations further comprise:

determining whether the confidence level of the first rule does not exceed the confidence level of the second rule by a threshold, wherein the first rule is deleted in response to determining that the second rule satisfies the minimum confidence level and the confidence level of the first rule does not exceed the confidence level of the second rule by the threshold.

12. The article of manufacture of claim 1, wherein multiple rules are generated to associate conditions in the at least one predictor column with subsequences in the at selected at least one region, and wherein the operations further comprise:

filtering the generated rules to determine a filtered set of rules; and converting the filtered set of rules into data validation rules to apply to records in a data set, wherein each rule specifies that if a condition in at least one predictor column is satisfied, then the subsequence in the predicted column of the record matches the specified subsequence.

13. The article of manufacture of claim 1, wherein the predictor column comprises the predicted column, and wherein the relationship is determined for data in a region of the predictor column and subsequences from the same predicted column.

14. A system in communication with a data source including a data set having a plurality of columns and records providing data for each of the columns, comprising:

a processor; and a computer readable medium having a rule engine executed by the processor to perform operations, the operations comprising:

receiving selection of at least one predicted column for which rules are to be generated and at least one region of the selected at least one predicted column, wherein each region specifies data positions in the column;

processing the data set to determine association relationships among data in records in at least one predictor column from the data set and subsequences in the selected at least one region in records of the at least one predicted column, wherein the associations are determined between data in the records in the at least one predictor column and the subsequences of the selected at least one region in the records of the at least one predicted column; and generating at least one rule from the relationships specifying a condition based on the values in the records of the at least one predictor column that predicts at least one value in the selected region of the at least one predicted column.

15. The system of claim 14, wherein an association rules model is used to generate the rules for the values in the at least one predictor column and subsequences in the at least one selected region, and wherein the at least one selected region comprises an n-gram in the at least one predicted column, and wherein the at least one rule specifies an association of the value in at least one predictor column with N-grams of the selected region in the predicted column.

16. The system of claim 14, wherein generating at least one rule comprises:
generating at least one rule providing an association of at least one condition involving the at least one predictor column and a subsequence in the selected region.

17. The system of claim 14, wherein multiple rules are generated to associate values in the at least one predictor column with subsequences in the selected at least one region, wherein the rule engine operations further comprise:
removing rules that do not specify at least one condition for at least one predictor column that predicts a subsequence in the selected at least one region of the at least one predicted column.

18. The system of claim 14, wherein multiple rules are generated to associate conditions in the at least one predictor column with subsequences in the selected at least one region, wherein the rule engine operations further comprise:
determining rules having a same at least one predictor condition and different subsequences in the selected region of a same predicted column; and
merging the determined rules into a merged rule containing the different subsequences.

19. The system of claim 18, wherein the rule engine operations further comprise:
determining whether a sum of confidence levels for the determined rules having the same at least one predictor condition exceeds a minimum confidence level, wherein the determined rules are merged into the merged format rule in response to determining that the sum of the confidence levels exceeds the minimum confidence level.

20. The system of claim 14, wherein multiple rules are generated to associate conditions in the at least one predictor column with subsequences in the selected region, wherein the rule engine operations further comprise:
deleting any rules that do not satisfy a minimum confidence level.

21. The system of claim 14, wherein multiple rules are generated to associate conditions in the at least one predictor column with subsequences in the selected region, wherein the rule engine operations further comprise:

determining a first rule having a same at least one predictor condition as a second rule;
determining whether the determined first rule includes a first subsequence that is a subset of a second subsequence predicted in the second rule; and
deleting the determined first rule in response to determining that the first subsequence is the subset of the second subsequence.

22. A method, comprising:
processing a data set having a plurality of columns and records providing data for each of the columns;
receiving selection of at least one predicted column for which rules are to be generated and at least one region of the selected at least one predicted column, wherein each region specifies data positions in the column;
processing the data set to determine association relationships among data in records in at least one predictor column from the data set and subsequences in the selected at least one region in records of the at least one predicted column, wherein the associations are determined between data in the records in the at least one predictor column and the subsequences of the selected at least one region in the records of the at least one predicted column; and
generating at least one rule from the relationships specifying a condition based on the values in the records of the at least one predictor column that predicts at least one value in the selected region of the records in the at least one predicted column.

23. The method of claim 22, wherein an association rules model is used to generate the rules for the values in the at least one predictor column and subsequences in the at least one selected region, and wherein the at least one selected region comprises an n-gram in the at least one predicted column, and wherein the at least one rule specifies an association of the value in at least one predictor column with N-grams of the selected region in the predicted column.

24. The method of claim 22, wherein generating at least one rule comprises:
generating at least one rule providing an association of at least one condition involving the at least one predictor column and a subsequence in the selected region.

25. The method of claim 22, wherein multiple rules are generated to associate values in the at least one predictor column with subsequences in the selected at least one region, further comprising:
removing rules that do not specify at least one condition for at least one predictor column that predicts a subsequence in the selected at least one region of the at least one predicted column.

26. The method of claim 22, wherein multiple rules are generated to associate conditions in the at least one predictor column with subsequences in the selected at least one region, further comprising:
determining rules having a same at least one predictor condition and different subsequences in the selected region of a same predicted column; and
merging the determined rules into a merged rule containing the different subsequences.

27. The method of claim 26, further comprising:
determining whether a sum of confidence levels for the determined rules having the same at least one predictor condition exceeds a minimum confidence level, wherein the determined rules are merged into the merged format rule in response to determining that the sum of the confidence levels exceeds the minimum confidence level.

28. The method of claim 22, wherein multiple rules are generated to associate conditions in the at least one predictor column with subsequences in the selected region, further comprising:

deleting any rules that do not satisfy a minimum confidence level.

29. The method of claim 22, wherein multiple rules are generated to associate conditions in the at least one predictor column with subsequences in the selected region, further comprising:

determining a first rule having a same at least one predictor condition as a second rule;

determining whether the determined first rule includes a first subsequence that is a subset of a second subsequence predicted in the second rule; and deleting the determined first rule in response to determining that the first subsequence is the subset of the second subsequence.

30. The method of claim 29, further comprising:

determining whether the second rule satisfies a minimum confidence level, wherein the first rule is deleted in response to determining that the second rule satisfies the minimum confidence level;

deleting the second rule in response to determining that the confidence level of the second rule does not satisfy the minimum confidence level; and retaining the first rule in response to determining that the confidence level of the second rule does not satisfy the minimum confidence level and that the first rule satisfies the minimum confidence level.

* * * * *